United States Patent [19]
Sudo et al.

[11] Patent Number: 5,144,446
[45] Date of Patent: Sep. 1, 1992

[54] IMAGE DEFECT CORRECTING CIRCUIT FOR A SOLID STATE IMAGER

[75] Inventors: Fumihiko Sudo; Takashi Asaida, both of Kanagawa, Japan

[73] Assignee: Sony Corporation, Tokyo, Japan

[21] Appl. No.: 647,715

[22] Filed: Jan. 29, 1991

[30] Foreign Application Priority Data

Jan. 31, 1990 [JP] Japan ................................. 2-021121
Apr. 13, 1990 [JP] Japan ................................. 2-098003

[51] Int. Cl.$^5$ ........................................... H04N 5/335
[52] U.S. Cl. ............................ 358/213.11; 358/813.15; 358/213.17; 358/228
[58] Field of Search ................ 358/209, 228, 909, 227, 358/213.11, 213.15, 213.17, 213.19, 213.16, 163, 139

[56] References Cited

U.S. PATENT DOCUMENTS

| | | | |
|---|---|---|---|
| 4,167,754 | 9/1979 | Nagumo et al. | 358/167 |
| 4,237,488 | 12/1980 | Takemura | 358/213.17 |
| 4,739,495 | 4/1988 | Levine | 358/213.15 |
| 4,805,023 | 2/1989 | Younse | 358/213.17 |
| 4,910,598 | 3/1990 | Itakura | 358/213.17 |

Primary Examiner—Howard W. Britton
Assistant Examiner—Sherrie Hsia
Attorney, Agent, or Firm—Philip M. Shaw, Jr.

[57] ABSTRACT

An image defect correcting circuit for a solid state imager arranged such that levels of output signals form respective pixels of a solid state image pickup element illuminated on its whole surface a light of uniform brightness are compared with a predetermined level, data indicative of a position of a pixel which outputs a signal of peculiar level is generated on the basis of a compared result, a video signal output from at least the pixel located at the position indicated by the position data is interpolated by using output signals of other pixels according to an interpolation processing and the output signals of the respective pixels and the video signal generated by the interpolation processing are selectively output on the basis of the position data.

19 Claims, 17 Drawing Sheets

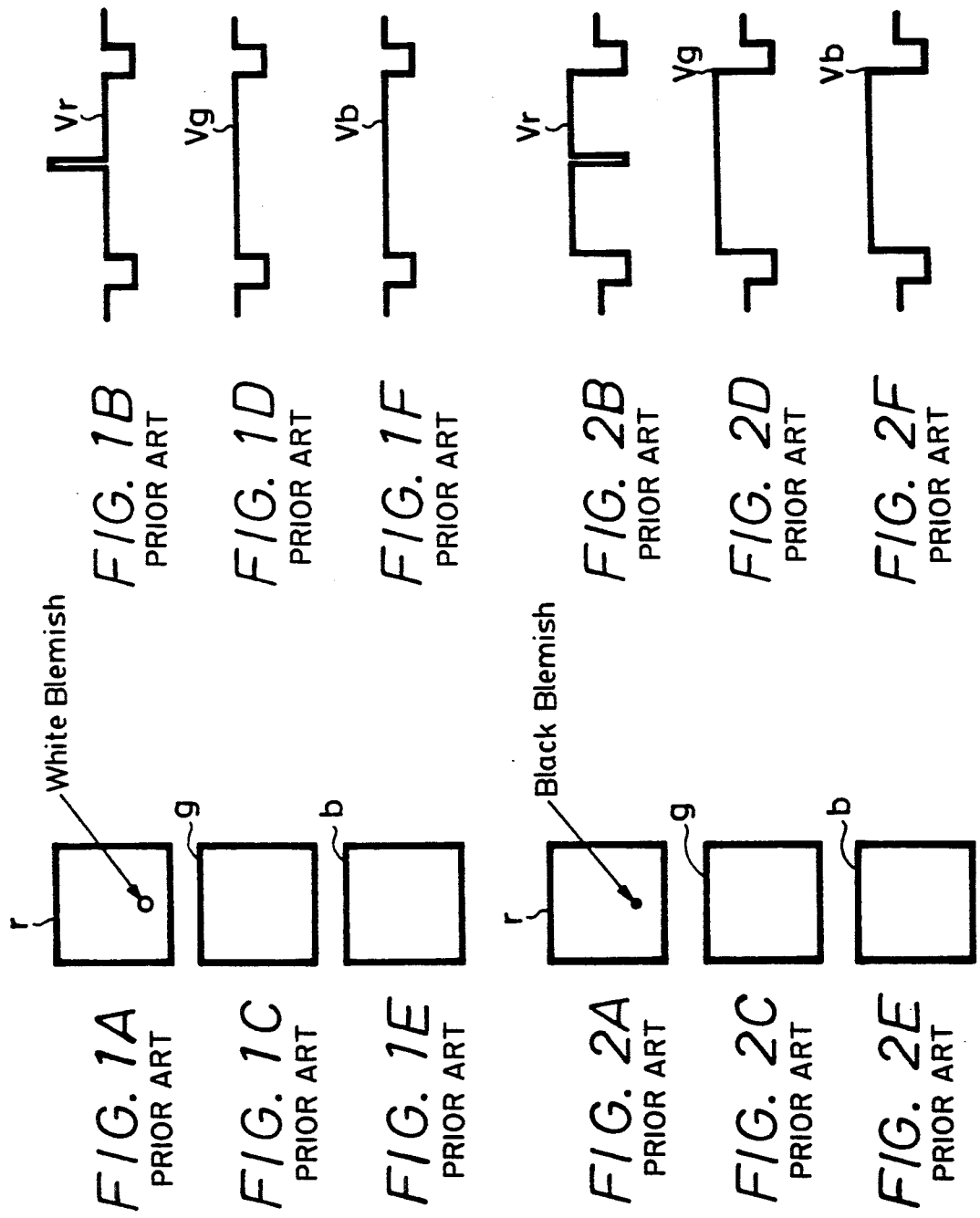

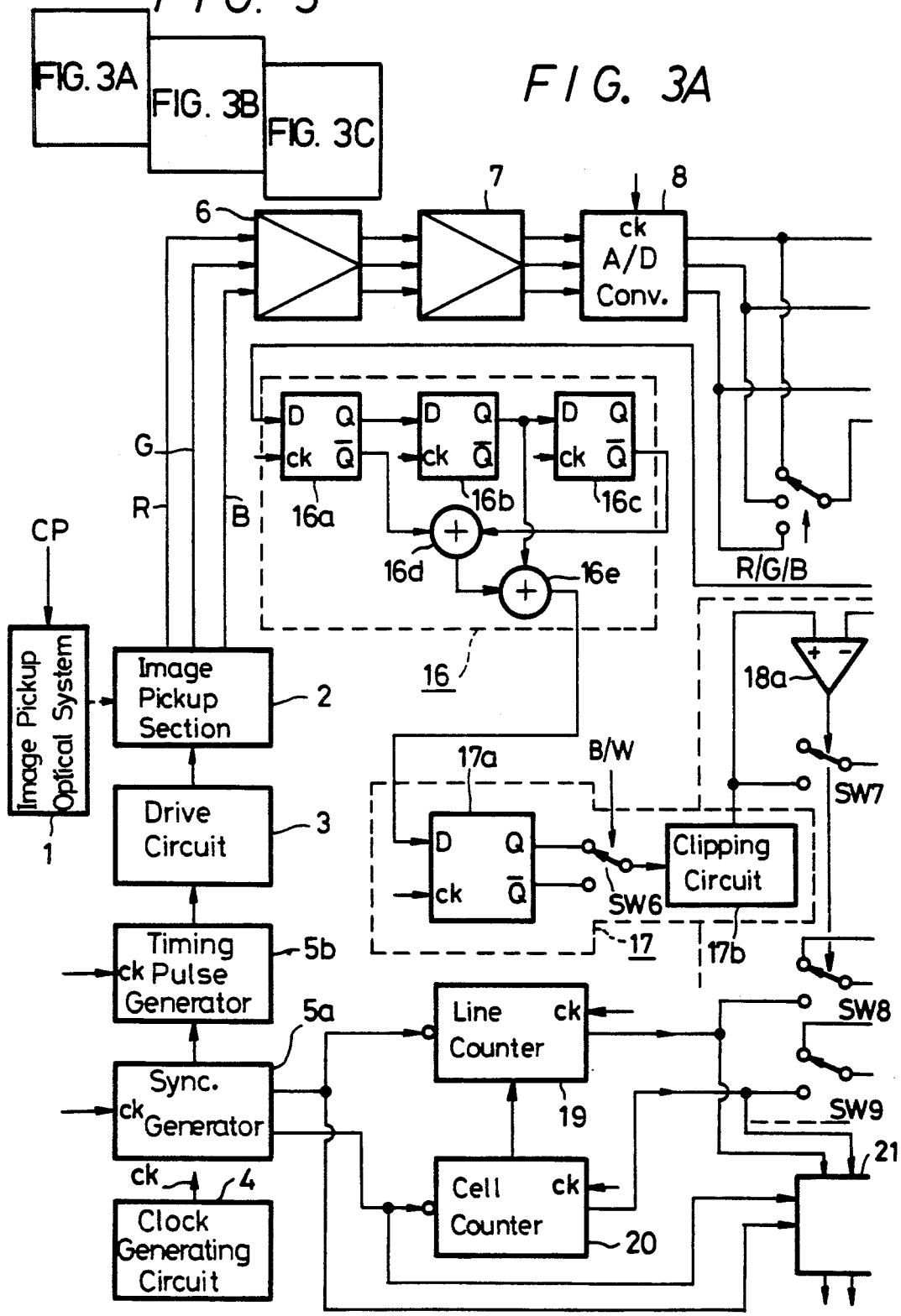

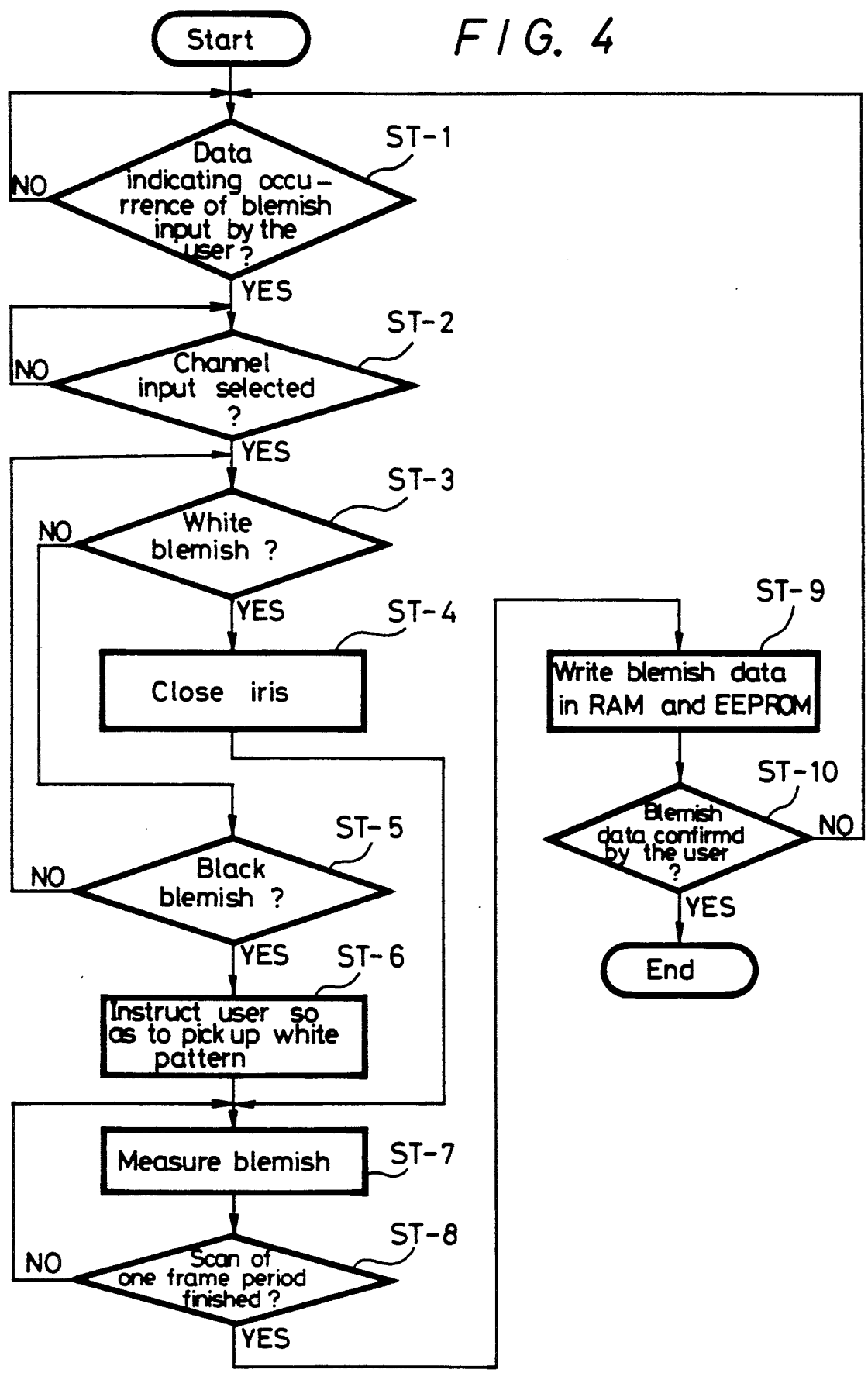

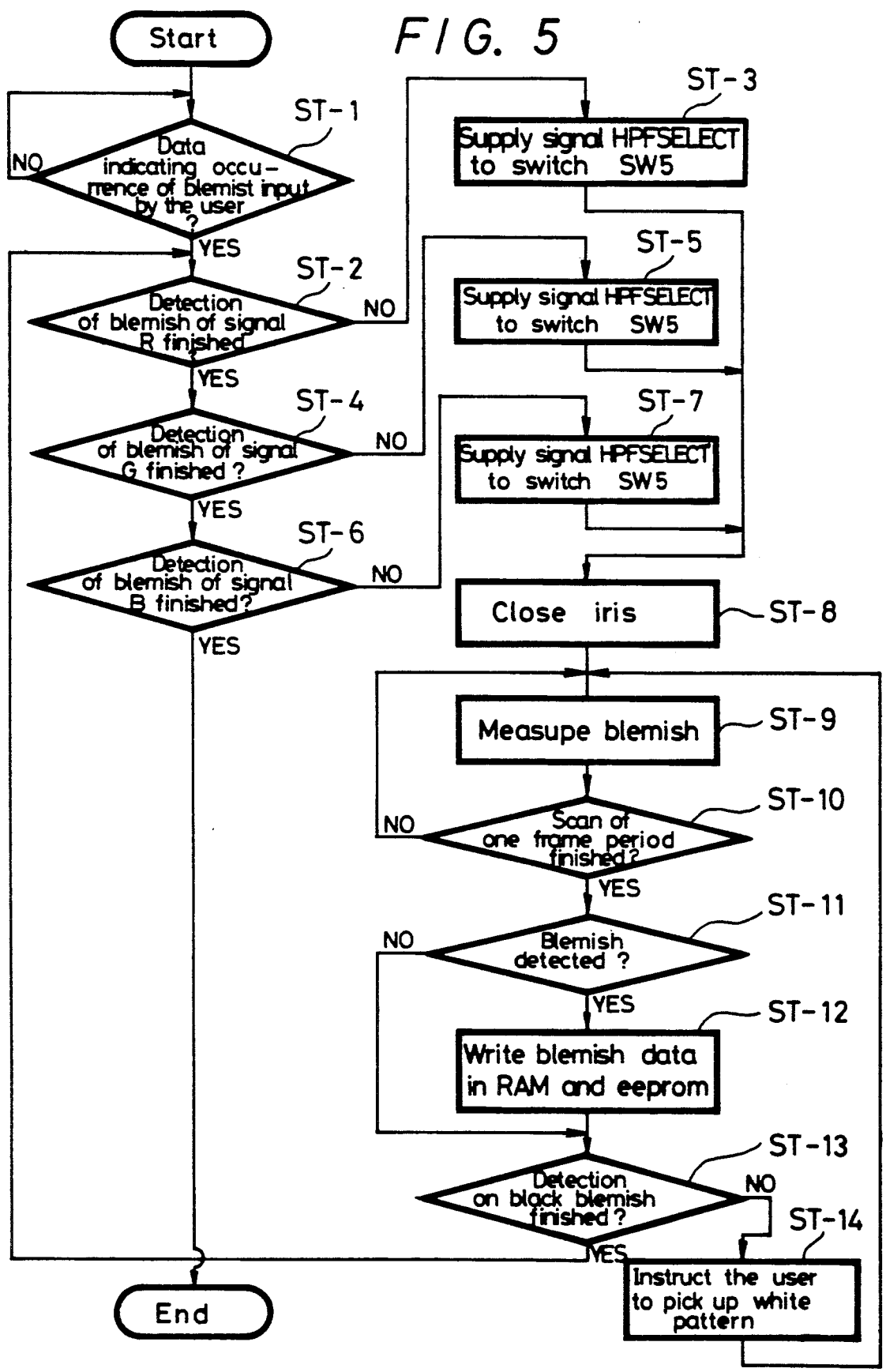

FIG. 13

| Latch Data Q1 Q2 Q3 Q4 | Selection Control Signal Output D_CTL |
|---|---|
| H H H H | M_H |
| H H H L | M_H |
| H H L H | M_H |
| H H L L | M_R |
| H L H H | M_H |
| H L H L | M_R |
| H L L L | M_H |
| L H H H | M_H |
| L H L H | M_L |
| L H L L | M_R |
| L L H H | M_L |
| L L H L | M_L |
| L L L H | M_H |
| L L L L | M_V |

FIG. 15A  FIG. 15B  FIG. 15C
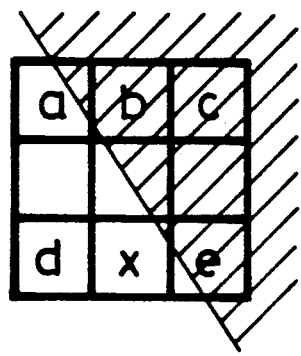 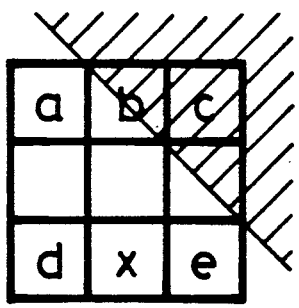 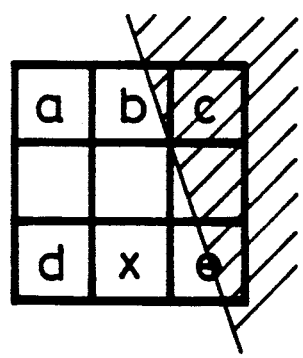
FIG. 16A  FIG. 16B  FIG. 16C
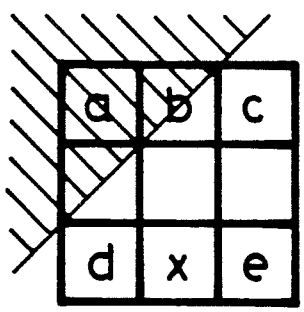 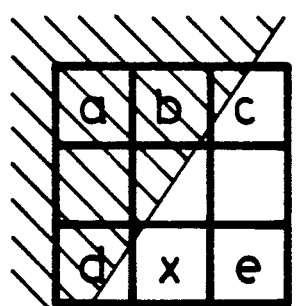 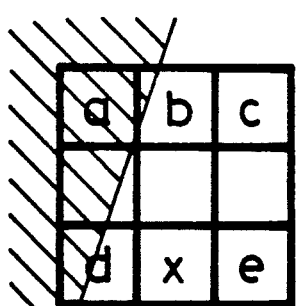
FIG. 17A  FIG. 17B
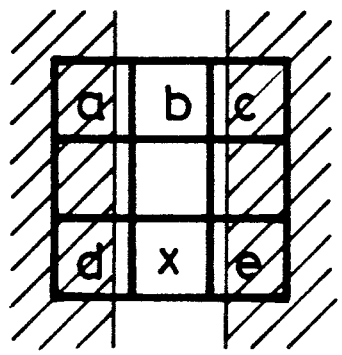 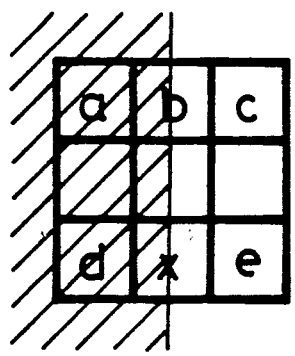

IMAGE DEFECT CORRECTING CIRCUIT FOR A SOLID STATE IMAGER

BACKGROUND OF THE INVENTION

1. Field of the Invention

The present invention generally relates to an image defect correcting circuit for a solid state imager which corrects image defect involved in an output image of a solid state image pickup element. More particularly, this invention relates to an image defect correcting circuit for a solid state imager in which an image defect involved in an output image of a solid state image pickup element is corrected in accordance with an image defect position information generated on the basis of an output of the solid state image pickup element.

2. Description of the Prior Art

Of pixels (picture elements) of a solid state image pickup element, a pixel, which is not operated normally due to lattice defect or the like, is what might be called a blemish. Of the blemishes, a blemish produced by a pixel which generates a large voltage as compared with other normal pixels, is called a white blemish, while a blemish produced by a pixel which generates a small voltage or which produces substantially no voltage as compared with other normal pixels, is called a black blemish.

FIGS. 1A to 1F show, when an iris of a so-called three CCD (charge coupled device) type television camera is closed, respectively, its solid state image pickup elements r, g and b and red, green and blue video signals Vr, Vg and Vb output from these solid state image pickup elements r, g and b.

As is clear from FIGS. 1A to 1F, since the solid state image pickup elements g and b shown in FIGS. 1C and 1E have no blemish, the video signals Vg and Vb from these solid state image pickup elements g and b have level corresponding to the level under the condition such that no light is incident thereon as shown in FIGS. 1D and 1F. On the other hand, the solid state image pickup element r shown in FIG. 1A has a white blemish at a position shown by a solid arrow in FIG. 1A. Accordingly, as shown in FIG. 1B, in the video signal Vr from this solid state image pickup element r, the level thereof becomes high at the position of the video signal Vr corresponding to the pixel shown by the solid arrow in FIG. 1A.

FIGS. 2A to 2F show, respectively, solid state image pickup elements r, g and b and red, green and blue video signals Vr, Vg and Vb output from these solid state image pickup elements r, g and b when the three CCD television camera similarly to FIG. 1 is used and a white diffusion plate (illuminated in the direction opposite to the camera pick up direction by an illumination and this condition will not be changed in the following description) is picked up by this television camera.

As is clear from FIGS. 2A to 2F, since the solid state image pickup elements g and b shown in FIGS. 2C and 2E have no blemish, levels of video signals Vg and Vb from these solid state image pickup elements g and b are equal to levels in which the respective solid state image pickup elements are illuminated on their whole surfaces with a light of uniform brightness. On the other hand, the solid state image pickup element r shown in FIG. 2A has a black blemish at a position shown by a solid arrow in FIG. 2A. Accordingly, in the video signal Vr from this solid state image pickup element r, as shown in FIG. 2B, regardless of the fact that the solid state image pickup element r is illuminated on its entire surface with a light of uniform brightness, the level of the position of the video signal Vr corresponding to a pixel shown by the solid arrow in FIG. 2A becomes substantially zero.

When a video signal from the television camera having incorporated therein the solid state image pickup elements having white and black blemishes shown in FIGS. 1A to 1F and FIGS. 2A to 2F is supplied to and displayed on a monitor receiver, if an iris of the television camera is closed, a white blemish is displayed on the picture screen of the monitor receiver. When the white diffusion plate, for example is picked up by the television camera, a black blemish is displayed on the picture screen of the monitor receiver.

It is substantially impossible to perfectly prevent white and black blemishes of the solid state image pickup element from occurring in the manufacturing-process of the solid state image pickup element. Further, even in the solid state image pickup element where no blemish is discovered in the manufacturing-process, it is frequently observed that a white or black blemish occurs in such solid state image pickup element during such solid state image pickup element is fabricated into a housing of a television camera and is used as the television camera.

Conventionally, as is well known from, for example, Japanese Patent Published Gazette No. 60-34872 the detection of blemish is carried out on each solid state image pickup element, the position of the detected blemish in the solid state image pickup element is detected, and data indicative of the position of blemish is written in a read only memory (ROM). Then, the solid state image pickup element and the ROM are incorporated into the camera apparatus so that, when they are used as the television camera, on the basis of the data indicating the position of blemish read out from the ROM, a video signal output from a pixel having a blemish is interpolated by using output data from other normal pixels.

Incidentally, according to the method in which the solid state image pickup element is inspected independently and address of defective pixel is written in the ROM, the solid state image pickup element and the ROM therefor must be constantly administered perfectly as a pair.

Further, when a new blemish occurs after the solid state image pickup element and the ROM as a pair are incorporated into the housing of the camera apparatus and bought by the user as the television camera, such camera apparatus is returned from the user, the solid state image pickup element and the ROM are again disassembled from the housing of the camera apparatus, and the solid state image pickup element is inspected to detect a defective pixel and an address thereof. If the ROM is a so-called one-time ROM, a new ROM is prepared and if the ROM is an EPROM (electrically programmable ROM), all data are erased and addresses of all defective pixels detected are written in the EPROM. Then, such solid state image pickup element and the ROM as a pair ar assembled into the housing of the camera apparatus and returned to the user.

As described above, in the conventional image defect correcting apparatus, a corresponding relation between the solid state image pickup element and the ROM must be administered, and when new black blemish or new white blemish occurs after the assembly-process, the solid state image pickup element and the ROM must be disassembled from the housing of the camera apparatus and data must be changed. Then, they must be again assembled into the housing of the camera apparatus, which is considerably cumbersome.

OBJECTS AND SUMMARY OF THE INVENTION

Accordingly, it is an object of the present invention to provide an improved image defect correcting circuit for a solid state imager in which the aforenoted shortcomings and disadvantages encountered with the prior art can be substantially eliminated.

More specifically, it is an object of the present invention to provide an image defect correcting circuit for a solid state imager in which, even when a new crystal defect occurs in a solid state image pickup element, an image defect involved in an output image from that solid state image pickup element can be corrected satisfactorily.

It is another object of the present invention to provide an image defect correcting circuit for a solid state imager in which, when an image defect involved in an output image from a solid state image pickup element is corrected by an interpolation processing, a deterioration of image quality at the corrected portion can be suppressed to the minimum.

According to a first aspect of the present invention, an image defect correcting circuit for a solid state imager is comprised of a comparator for comparing levels of output signals of pixels of a solid state image pickup element illuminated on its whole surface with a light of uniform brightness with a predetermined level, a position data generating circuit for generating data indicative of a position of a pixel which outputs a signal of peculiar level on the basis of the compared result of the comparator, an interpolating circuit for interpolating an output signal from the pixel located at the position indicated by the position data generated by the position data generating circuit by using output signals of other pixels and a change switch for selectively outputting the output signals of respective pixels and an output signal of the above interpolating circuit on the basis of an output signal from the position data generating circuit.

As a second aspect of the present invention, an image defect correcting circuit for a solid state imager is provided, in which a video information corresponding to a position of a defective pixel of a plurality of pixels of the solid state image pickup element is generated on the basis of a video information from pixels located at other positions according to an interpolation processing. This image defect correcting circuit for a solid state imager is comprised of a comparator for comparing levels of video signals derived from a plurality of pixels located in the vicinity of the defective pixel, a selecting circuit for selecting the video information of the pixel used in the interpolation processing on the basis of the compared result from the comparator and an interpolating circuit for generating the video information corresponding to the position of the defective pixel on the basis of the video information of the pixel selected by the selecting circuit according to the interpolation processing.

The above, and other objects, features and advantages of the present invention will become apparent in the following detailed description of illustrative embodiments thereof to be read in conjunction with the accompanying drawings, in which like reference numerals are used to identify the same or similar parts in the several views.

BRIEF DESCRIPTION OF THE DRAWINGS

FIGS. 1A to 1F are schematic diagrams, respectively, used to explain a white blemish involved in an output image from a solid state image pickup element;

FIGS. 2A to 2F are schematic diagrams, respectively, used to explain a black blemish involved in an output image from a solid state image pickup element;

FIGS. 4, 5, 6 and 7 are flowcharts, respectively, to which references will be made in explaining operation of the image defect correcting circuit for a solid state imager shown in FIG. 3;

FIG. 13 is a table to which references will be made in explaining operation of a decoder shown in FIG. 11;

FIGS. 15A, 15B and 15C are diagrams, respectively, schematically showing stripe patterns oriented in the upper left direction picked up by the pixels near the defective pixel of the solid state image pickup element shown in FIG. 12;

FIGS. 16A, 16B and 16C are diagrams, respectively, schematically showing stripe patterns oriented in the upper right direction picked up by the pixels near the defective pixel of the solid state image pickup element shown in FIG. 12;

FIGS. 17A and 17B are diagrams, respectively, schematically showing stripe patterns in the vertical direction picked up by the pixels near the defective pixel of the solid state image pickup element shown in FIG. 12;

DETAILED DESCRIPTION OF THE PREFERRED EMBODIMENTS

The present invention will now be described in detail with reference to the accompanying drawings.

Figure 3B:
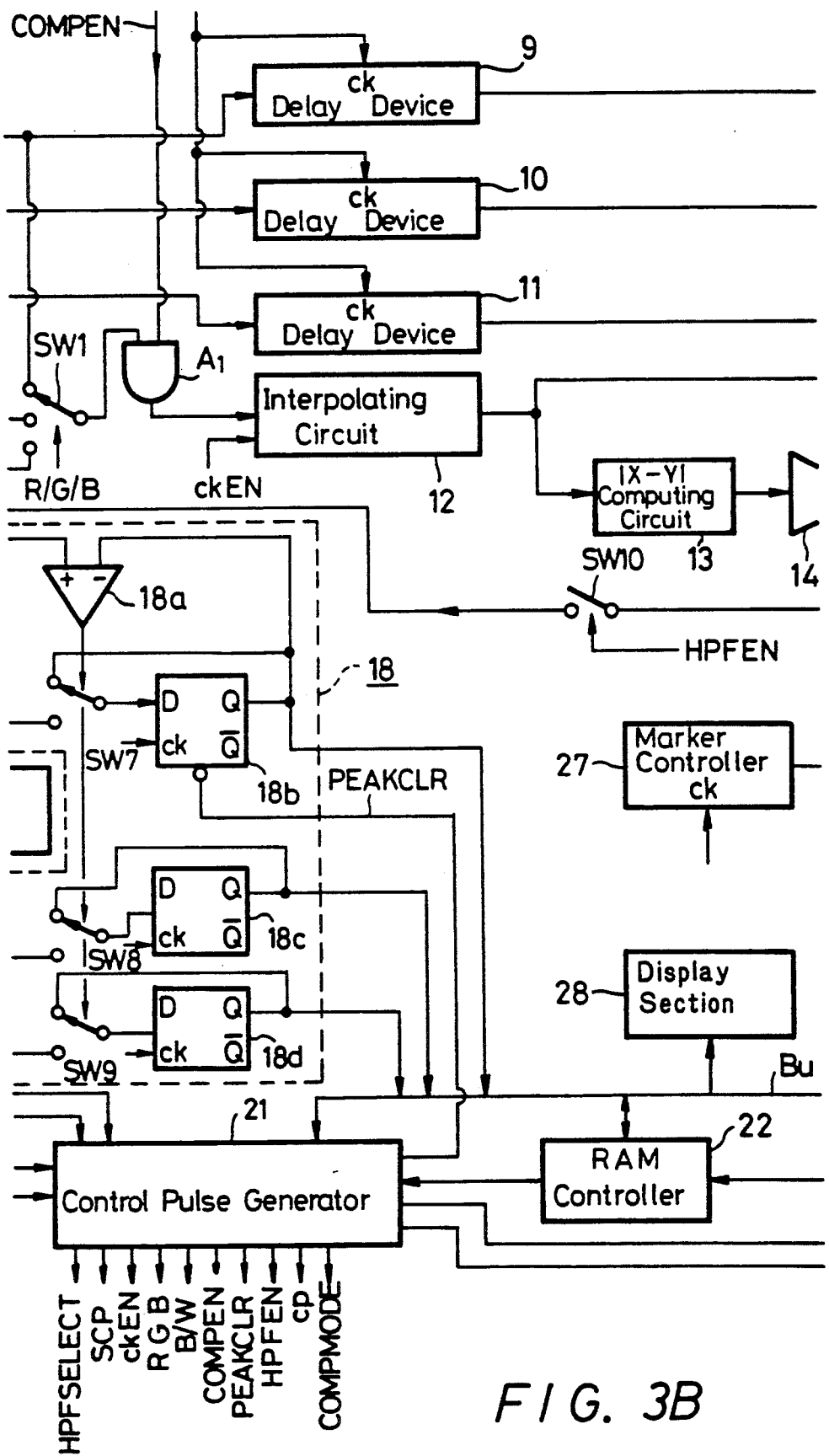
FIG. 3 (formed of FIGS. 3A, 3B and 3C drawn on three sheets of drawings so as to permit the use of a suitably large scale) is a block diagram showing a first embodiment of an image defect correcting circuit for a solid state image pickup element according to the present invention.
Figure 3C:
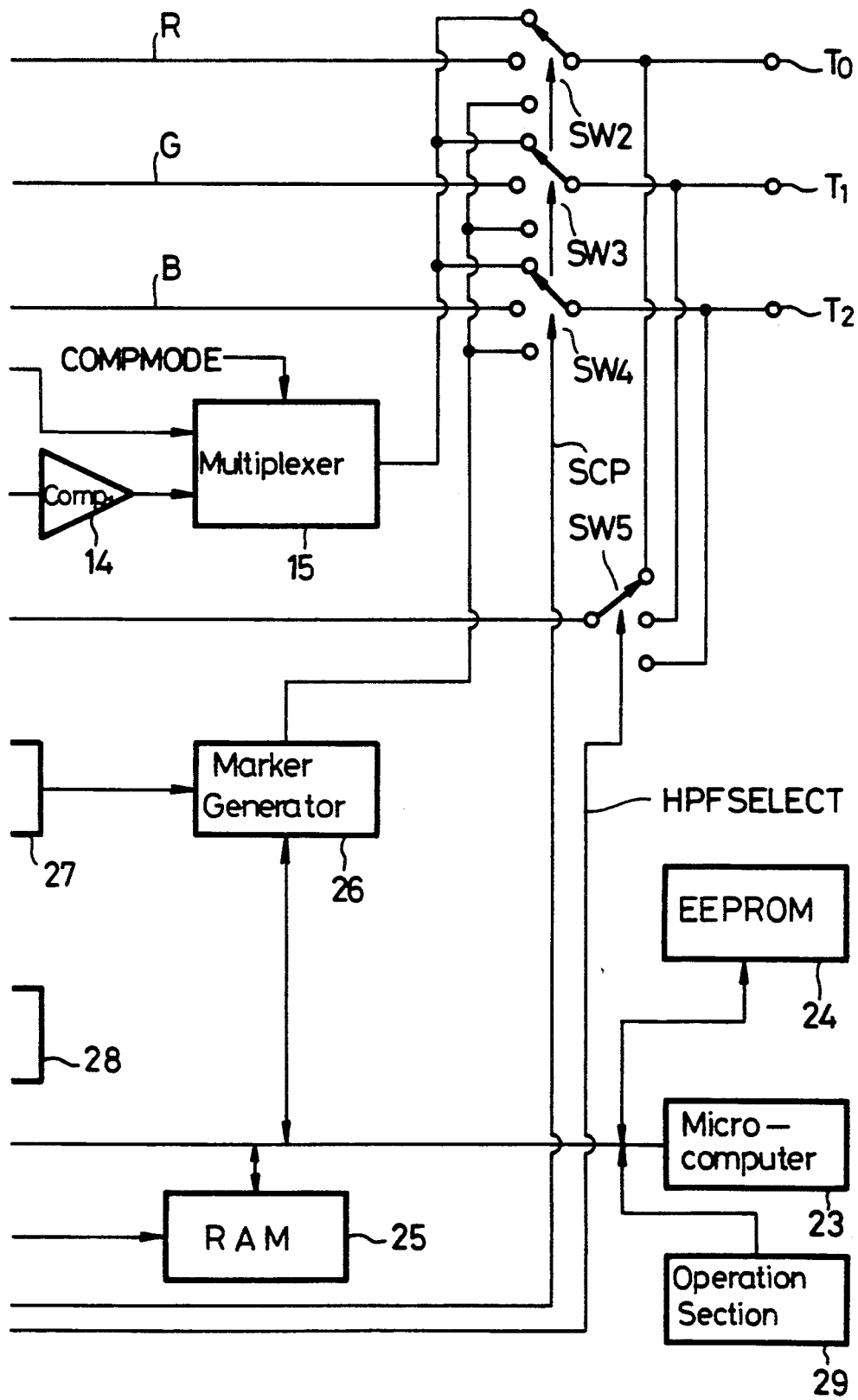

Incidentally, FIG. 3 is formed of FIGS. 3A, 3B and 3C drawn on three sheets of drawings so as to permit the use of a suitably large scale, and illustrates one portion of a solid state imager according to the present invention and an image defect correcting circuit thereof. Initially, three modes, which premise the solid state imager having the image defect correcting circuit according to the present invention and a control system will be explained hereinafter, and then respective sections of this apparatus will be explained.

The solid state imager having the image defect correcting circuit according to the present invention has three modes, such as normal image pickup mode, an image pickup mode for detecting a defective picture element (i.e., pixel) and a defective pixel designating mode (this mode is selected by the user). In the normal image pickup mode, a correcting circuit system having a correcting function for correcting a defective pixel is operated. Further, the solid state imager of the present invention has a self-test function to automatically detect a defective pixel during one frame period when the solid state imager is powered. The aforenoted three modes are selected by the user, and if neither the image pickup mode for detecting the defective pixel nor the defective pixel designating mode is selected by the user, the solid state imager is placed in the normal image pickup mode after the self-test is finished when being powered.

The control system will be explained next, and in the control system, a control pulse generator 21, a RAM (random access memory) controller 22, a microcomputer 23, a RAM 25, an EEPROM (electrically erasable and programmable read only memory) 24, a display section 28 and an operation section 29 are particularly associated with the above-described three modes.

Address of blemish in the solid state image pickup element and data determining whether the blemish is white blemish or black blemish checked in the factory beforehand are stored in the EEPROM 24. The microcomputer 23 having a ROM and a RAM switches the three modes, i.e, the normal image pickup mode, the defective pixel detection image pickup mode and the defective pixel designating mode on the basis of a mode selecting signal from the operation section 29 and data stored in the EEPROM 24 and performs the self-test when the solid state imager is powered, thereby controlling the control pulse generator 21. Under the control of the microcomputer 23, the control pulse generator 21 generates various control signals on the basis of address data from a line counter 19 and a cell counter 20 which will be referred to later.

The RAM controller 22 controls the RAM 25 under the control of the microcomputer 23 so that, when the solid state imager is actuated, data stored in the EEPROM 24 are stored in the RAM 25, new defective pixel data is stored in the RAM 25 or that the data is updated. The switching operation of the above-described three modes and so on are effected by the user by operating the operation section 29 in accordance with the display on the display section 28.

The respective sections of this apparatus will be explained hereinafter in the sequential order of the mode when the apparatus is actuated and the three modes. Incidentally, while the self-test in the actuation state must be explained initially, this self-test will be explained when the defective pixel detection image pickup mode is explained because the circuits and the operation of the self-test are substantially the same as those of the defective pixel detection image pickup mode.

Initially, the normal image pickup mode will be explained with reference to FIG. 3.

Referring to FIG. 3, there is shown an image pickup optical system 1 which is composed of an iris, an iris driving means for driving the iris by a drive signal CP from the control pulse generator 21, a lens (not shown), a filter and so on (not shown). An image pickup section 2 is composed of three solid state image pickup elements (e.g., charge coupled devices or the like) in which object images, which result from analyzing the image pickup light into three primary color components such as red (R), green (G) and blue (B), are focused on the image pickup screens. The drive operation of the image pick up section 2 will be explained next. A sync. (synchronizing) generator 5a is adapted to generate a reference horizontal sync. signal and a reference vertical sync. signal on the basis of a reference clock from a clock generating circuit 4. A timing generator 5b is adapted to generate horizontal and vertical transfer pulses synchronized with the reference horizontal sync. signal and the reference vertical sync. signal from the sync. generator 5a. A driving circuit 3 is adapted to respectively drive solid state image pickup elements of the image pickup section 2 on the basis of the horizontal and vertical transfer pulses from the timing pulse generator 5b.

Referring back to the image pickup section 2, the image pickup video signals R, G and B from the image pickup section 2 are supplied through a pre-amplifier 6 and a video amplifier 7 for adjusting white balance to an analog-to-digital (A/D) converter 8. The image pickup video signals R, G and B are respectively converted into digital image pickup video signals (hereinafter referred to as digital video signals) by the A/D converter 8. The respective digital video signals R, G and B from the A/D converter 8 are respectively supplied to delay devices 9, 10 and 11, each being formed of a charge coupled device (CCD) or the like. These digital video signals R, G and B are delayed by predetermined delay times by these delay devices 9, 10 and 11 on the basis of the clock pulse CK from the clock generator circuit 4 and then supplied through switches SW2, SW3 and SW4 to output terminals T0, T1 and T2 and also supplied through switches SW5 and SW10 to a high-pass filter 16 which will be described later. Incidentally, the switches SW2 to sw4 are controlled to opened and/or closed by a control signal SCP from the control pulse generator 21. On the other hand, the respective digital video signals R, G and B from the A/D converter 8 are supplied to an AND circuit A1 through a switch S1 which is changed in position in response to an R/G/B signal from the control pulse generator 21. In this AND circuit Al, the digital video signals R, G and B are ANDed with a power save signal COMPEN from the control pulse generator 21 and which becomes active only in the interpolation, and fed to a interpolating circuit 12 which will be explained later.

When a clock enable signal ckEN from the control pulse generator 21 is active, the interpolating circuit 12 latches pixel data of addresses of upper left, above, upper right, left and right of defective pixel on the basis of address data of the RAM 25 which stores therein the contents stored in the EEPROM 24 in the actuation of the apparatus and supplies the latched pixel data to a $|X-Y|$ computing device 13 and a multiplexer 15 which will be referred to below.

The $|X-Y|$ computing device 13 produces an absolute values of differences of the respective pixel data from the interpolating circuit 12 and supplies the same to a comparator 14. The comparator 14 compares the respective difference signals from the $|X-Y|$ computing device 13 and supplies the compared result to the multiplexer 15. The multiplexer 15 supplies, of the respective pixel data from the interpolating circuit 12, pixel data corresponding to the compared result signal from the comparator 14 to the switches SW2, SW3 and SW4 as compensation pixel data of defective pixel data. Incidentally, the detailed arrangement of the interpolating means including the interpolating circuit 12, the $|X-Y|$ computing device 13, the comparator 14 and the multiplexer 15 is substantially similar to that of an interpolation information generating means of other embodiment which will be described later in detail with reference to FIG. 11.

These switches SW2, SW3 and SW4 are switched by the switching signal SCP from the control pulse generator 21, whereby the video signals in which the defective pixels are corrected are supplied to the terminals T0, T1 and T2 and also supplied through the switches SW5 and SW10 to the high-pass filter 16 that will be described in later stage.

The image pickup mode for detecting the defective pixel will be explained next. The video image mode for detecting a defective pixel is effected as follows. When the power switch of the solid state imager is turned ON and when the user supplies a video signal of, for example, the solid state imager to a monitor receiver and founds out a blemish in a picture displayed on a picture screen of the monitor receiver, the user operates the operation section 29 in accordance with the display on the display section 28 and selects the image pickup mode for detecting the defective pixel. In that case, a white blemish is detected first. In any of the above-mentioned cases, a switch change-over signal HPFSSECT from the control pulse generator 21 controls the switching operation of the switch SW5 to select any of the video signals R, G and B from the three solid state image pickup elements. Incidentally, the switch change-over signal HPFSELECT may be input by, for example, the user. The iris drive signal CP from the control pulse generator 21 is supplied to an iris driving means (not shown) of the image pickup optical system 1 and close the iris and the control pulse generator 21 generates a black/white blemish switching signal B/W. Generally, it is known that most of blemish occurred after the delivery of the solid state imager from the factory is white blemish. In the self-test mode after the apparatus is actuated, the detection of black blemish is not detected, whereas in the image pickup mode for detecting the defective pixel, the detection of white blemish is performed after the iris is closed. When the white blemish is not detected, the user is instructed such that a white diffusion plate illuminated, for example, with an illumination light is displayed on the display section 28, thereby the detection of black blemish being effected.

The high-pass filter 16, a clipping circuit 17 and a peak hold circuit 18 used in the aforenoted mode will be explained hereinafter, and initially, the high-pass filter 16 will be explained.

The video signal stored in the EEPROM 24 and in which the portion of defective pixel is corrected is supplied to the high- pass filter 16 via the switch SW10 which is turned ON by a detection enable signal HPFEN supplied from the control pulse generator 21 and which becomes active during, for example, one frame period under the control of the microcomputer 23 when the apparatus is actuated and when the image pickup mode for detecting the defective pixel is selected by the user by operating the operation section 29. The high-pass filter 16 is a digital filter composed of three D-type flip-flops 16a, 6b, 16c and two adding circuits 16d, 16e and is what might be called a Laplacian filter of the horizontal direction.

A digital video signal applied to a data input terminal D of the D-type flip-flop 16a is output from a non-inverting output terminal Q thereof and fed to a data input terminal D of the next D-type flip-flop (hereinafter simply referred to as a flip-flop) 16b. The outuput from a non-inverting output terminal Q of the flip-flop 16b is supplied to a data input terminal D of the next flip-flop 16c. On the other hand, a digital video signal from an inverting input terminal $\overline{Q}$ of the flip-flop 16a is supplied to the adder 16d, in which it is added with a digital video signal from an inverting input terminal $\overline{Q}$ of the flip-flop 16c. An output signal from the adder 16d is supplied to the adder 16e, in which the output signal from the adder 16d and a digital video signal from a non-inverting input terminal Q of the flip-flop 16b are added to produce a digital video signal filtered-out by a characteristic of $-z^{-1}+2z^0-z^1$, that is, a characteristic in which a peak exists at a frequency of the portion corresponding to a defective pixel in the digital video signal and from which DC and low frequency components are removed.

The clipping circuit 17 will be explained. The digital video signal from the high-pass filter 16 is supplied to the clipping circuit 17. The clipping circuit 17 is comprised of a flip-flop 17a, a clipper 17b and a switch SW6 connecting the flip-flop 17a and the clipper 17b and which switchs and supplies at non-inverting and inverting output terminals Q and $\overline{Q}$ of the flip-flop 17a to the clipper 17b. Since the movable contact of the switch SW6 is switched to a fixed contact connected to the non-inverting input terminal Q of the flip-flop 17a when the black/white blemish switching signal B/W from the control pulse generator 21 is, for example, "1", the digital video signal supplied to the flip-flop 17a is supplied to the clipper 17b via the switch SW6. This digital video signal clipped by the clipper 17b is then fed to the peak hold circuit 18 which will be described below.

The peak hold circuit 18 and the line counter 19 and the cell counter 20, each of which are indispensable for the peak hold circuit 18 will be explained herein. The 10-bit synchronizing type cell counter 20 is reset by the reference sync. signal supplied to its reset terminal from the sync. generator 5a and counts the clock from the clock generating circuit 4. The count value of the cell counter 20 is fed to the peak hold circuit 18, which will be referred to later, and to the control pulse generator 21. The count values of the cell counter 20 respectively correspond to addresses of the solid state image pickup element in the horizontal direction. When counting one horizontal period of the reference horizontal sync. signal, the cell counter 20 supplies a carry pulse to the line counter 19. The 9-bit synchronizing type line counter 19 is reset by the reference vertical sync. signal supplied to its reset terminal from the sync. generator 5a and counts the clock ck from the clock generating cirucit 4 in response to each carry pulse from the cell counter 20. The count value of the line counter 19 is supplied to the peak hold circuit 18 which will be described later and to the control pulse generator 21. The count values of the line counter 19 respectively correspond to addresses of the solid state image pickup element in the vertical direction.

Referring back to the peak hold circuit 18, the peak hold circuit 18 is composed of a comparator 18a for comparing the present and past digital video signals, a flip-flop 18b for storing an absolute value of level of the past digital video signal, a 10-bit flip-flop 18d for storing a horizontal address of a defective pixel, a 9-bit- flip-flop 18c for storing a vertical address of the defective pixel and switches SW7, SW8 and SW9.

The digital video signal from the clipping circuit 17 is supplied to a non-inverting input terminal of the comparator 18a and to an input terminal D of the flip-flop 18b, respectively, because the switches SW7, SW8 and SW9 are connected in the illustrated state in the normal state, or when the peak level provided by the defective pixel is not detected. Accordingly, the present digital video signal and the past digital video signal are compared with each other. When the comparator 18a detects the peak level, by the output signal of the comparator 18a, the switches SW7, SW8 and SW9 are connected to the states opposite to the illustrated states, whereby the content indicating the level of the register of the flip-flop 18b and contents of horizontal and vertical addresses of registers of the flip-flops 18d and 18c are rewritten. Rewritten data from the flip-flops 18b, 18d and 18c are supplied through a bus (formed of address bus, data bus and control bus) Bu to the microcomputer 23, stored in the RAM 25 as new data and further stored in the EEPROM 24 as backup data. Incidentally, the respective flip-flops 18b, 18c and 18d are reset by a reset signal PEAKCLR supplied thereto from the control pulse generator 21 when the apparatus is actuated.

A description will be next given on a method in which a video signal, which results from closing the iris of the solid state imager or picking up, for example, a white diffusion plate (it is assumed that the white diffusion plate be illuminated by a illumination light from the direction opposite to the image pickup direction), is supplied to a monitor receiver, such video signal is displayed on the picture screen of the monitor receiver and the user of the solid state imager registers a position of new blemish other than those registered beforehand, that is, the defective pixel designating mode.

Incidentally, the registration of the position of the defective pixel will be understood as follows: When a defective pixel cannot be detected by the above-mentioned solid state imager in the self-test mode and in the image pickup mode for detecting the defective pixel, the video signal from the solid state imager is supplied to the monitor receiver and the user visually confirms a picture displayed on the picture screen of the monitor receiver (i.e., a black picture displayed when the iris is closed or a white picture displayed when the white diffusion plate is picked up). Then, the user moves a marker of, for example, a cross shape displayed on an arbitrary position on the picture screen of the monitor receiver to the position of a new blemish visually confirmed by operating a marker controller 27, which will be referred to later, of the solid state imager, and the position marked by the cross-shaped marker is stored in the RAM 25 and the EEPROM 24 of the solid state imager as the position of the defective pixel. In this defective pixel designating mode, a video signal provided before or after the interpolation processing based on defective pixel data already stored in the EEPROM 24 or the RAM 24 prior to the selection of this mode can be selected.

The marker controller 27 has, for example, a cursor key, and if the user pushes the cursor key, address data indicating the position of the cursor is increased and/or decreased during the depression of the cursor key. The address data is always supplied to a marker generator 26 which will be explained next. The marker generator 26 supplies data stored, for example, in an incorporated ROM and which indicates a cross-shaped marker whose width corresponds to one pixel through the switches SW2, SW3 and SW4 to the output terminals T0, T1 and T2 only when the address data from the marker controller 27 coincides with the address data supplied thereto via the bus Bu from the line counter 19 and the cell counter 20. When the user moves the cross-shaped marker to the position of the blemish to be newly registered by the cursor key and the cross-shaped marker exists on the position of blemish to be registered, if the user pushes, for example, the button, address data indicating the present position of the cross-shaped marker and a write control signal are supplied from the marker controller 27 through the marker generator 26 and the bus Bu to the RAM 25 and the microcomputer 23. Further, the white blemish or the black blemish is selected by the user by pushing a button or the like. The microcomputer 23 controls a RAM controller 22, which will be referred to later, via the bus Bu so that the address data from the marker controller 27 and the content of defective pixel designated by the user(content indicating whether the blemish is white blemish or black blemish) are written in the RAM 25.

Of the above-mentioned three modes, the image pickup mode for detecting the defective pixel will be explained with reference to a flowchart forming FIG. 4, in which case, the user performs several designations directly.

Referring to FIG. 4, following the Start of operation, it is determined in decision step ST-1 whether or not the user inputs data indicating the occurrence of blemish, that is, the user inputs data to select the image pickup mode for detecting a defective pixel. If a YES is output at decision step ST-1, then the processing proceeds to the next decision step ST-2, and if a NO is output at step ST-1, then the processing returns to step ST-1 whereat the apparatus awaits the data input by the user, or the apparatus is set in the normal image pickup mode.

It is determined in decision step ST-2 whether or not the channel input, i.e., the digital video signals R, G and B from the three image pickup elements are selected. If a YES is output at step ST-2, then the processing proceeds to the next decision step ST-3. If a NO is output at step ST-2, then the processing returns to step ST-2 and step ST-2 is repeated. In step ST-2, data indicative of channel may be input by the user or the digital video signals R, G and B may be automatically selected in that order.

In step ST-3, it is determined whether the blemish is the white blemish or not. If a YES is output at step ST-3, the processing proceeds to step ST-4, and if a NO is output at step ST-3, then the processing proceeds to the next decision step ST-5. In the step ST-4, the iris is closed and the processing proceeds to step ST-7.

It is determined in step ST-5 whether or not the blemish is the black blemish. If a YES is output at step ST-5, then a processing proceeds to step ST-6, and if a NO is output at step ST-5, then the processing returns to step step ST-3, whereat it is determined whether or not the blemish is the white blemish. Whether or not the blemish is the white blemish or the black blemish may be input by the user and alternatively, such determination may be automatically performed by the output state from the high-pass filter 16.

In step ST-6, the user is instructed to pick up a white pattern which instructions displayed on the display section 28 which is described with reference to FIG. 3, and then the processing proceeds to the next step ST-7.

In step ST-7, the blemish is measured, and then the processing proceeds to the next decision step ST-8.

It is determined in step ST-8 on the basis of address data from the line counter 19 and the cell counter 20 shown in FIG. 3 whether or not the scanning of one frame period is finished. If a YES is output at step ST-8, then the processing proceeds to step ST-9. If a NO is output at step ST-8, then the processing returns to step ST-7, whereat the blemish is measured.

In step ST-9, blemish data is written in the RAM 25 and the EEPROM 24, and then the processing proceeds to the next decision step ST-10.

It is determined at decision step ST-10 whether or not the user confirms the blemish data by the display on the display section 28 shown in FIG. 3. If a YES is output at step ST-10, then the processing is ended, and if a NO is output at step ST-10, then the processing returns to step ST-1, and step ST-1 and so on are repeated again.

Of the above-mentioned three modes, the mode that the user need not designate directly other than the image pickup mode for detecting the defective pixel will be explained briefly with reference to a flowchart forming FIG. 5.

Referring to FIG. 5, following the Start of operation, it is determined in decision step ST-1 whether or not the user input the data indicative of the occurrence of blemish, that is, whether or not the camera mode for detecting the defective pixel is selected. If a YES is output at step ST-1, then the processing proceeds to the next decision step ST-2, an if a NO is output at step ST-1, then the apparatus is set in the mode to await that input, namely, the normal camera mode.

It is determined in decision step ST-2 whether or not the detection of the blemish of the digital video signal R is finished. If a YES is output at step ST-2, then the processing proceeds to the next decision step ST-4 and if a NO is output at step ST-2, then the processing proceeds to step ST-3.

In step ST-3 the switch change-over signals HPFSELECT from the control pulse generator 21 shown in FIG. 3 is supplied to the switch SW5 to thereby select the digital video signal R, and then the processing proceeds to step ST-8.

In step ST-4, it is determined whether or not the detection of the blemish of the digital video signal G is finished. If a YES is output at step ST-4, then the processing proceeds to the next decision step ST-6, and if a NO is output at step ST-6, then the processing proceeds to step ST-5.

In step ST-5, the switch change-over signal HPFSELECT from the control pulse generator 21 shown in FIG. 3 is supplied to the switch SW5 to thereby select the digital video signal G, and the processing proceeds to step ST-8.

It is determined in decision step ST-6 whether the detection of the blemish of the digital video signal B is finished or not. If a YES is output at step ST-6, then the processing is ended, and if a NO is output at step ST-6, then the processing proceeds to step ST-7.

In step ST-7, the switch change-over signal HPFSELECT from the control pulse generator 21 shown in FIG. 3 is supplied to the switch SW5 to thereby select the digital video signal B, and then the processing proceeds to the next step ST-8.

In the next step ST-8, the iris is closed and then the processing proceeds to step ST-9. In step ST-9, the blemish is measured and the processing proceeds to the next decision step ST-10.

It is determined in decision step ST-10 by the address data from the line counter 19 and the cell counter 20 shown in FIG. 3 whether or not the scanning of one frame is finished. If a YES is output at step ST-10, then the processing proceeds to the next decision step ST-11. If a NO is output at step ST-10, then the processing returns to step ST-9, whereat the measurement of the blemish is continued.

It is determined in decision step ST-11 whether or not the blemish is detected. If a YES is output at step ST-11, then the processing proceeds to step ST-12, and if a NO is output at step ST-11, then the processing proceed to the next decision step ST-13.

In step ST-12, blemish data is written in the RAM 25 and the EEPROM 24 shown in FIG. 3 and the processing proceeds to the next decision step ST-13.

In step ST-13, it is determined whether the detection of black blemish is finished or not. If a YES is output at step ST-13, then the processing returns to step ST-2, and if a NO is output at step ST-13, then the processing proceeds to step ST-14.

In step ST-14, an instruction is displayed on the display portion 28 shown in FIG. 3, for the user to pick up a white pattern. Then, the processing returns to step ST-9, whereat the black blemish is detected.

Of the above-mentioned three modes, the self-test mode carried out when the power switch of the apparatus is turned on will be described in brief with reference to a flowchart of FIG. 6. Incidentally, in this self-test mode, the detection operation for automatically detecting a white blemish when the apparatus is actuated will be described below.

Figure 6:
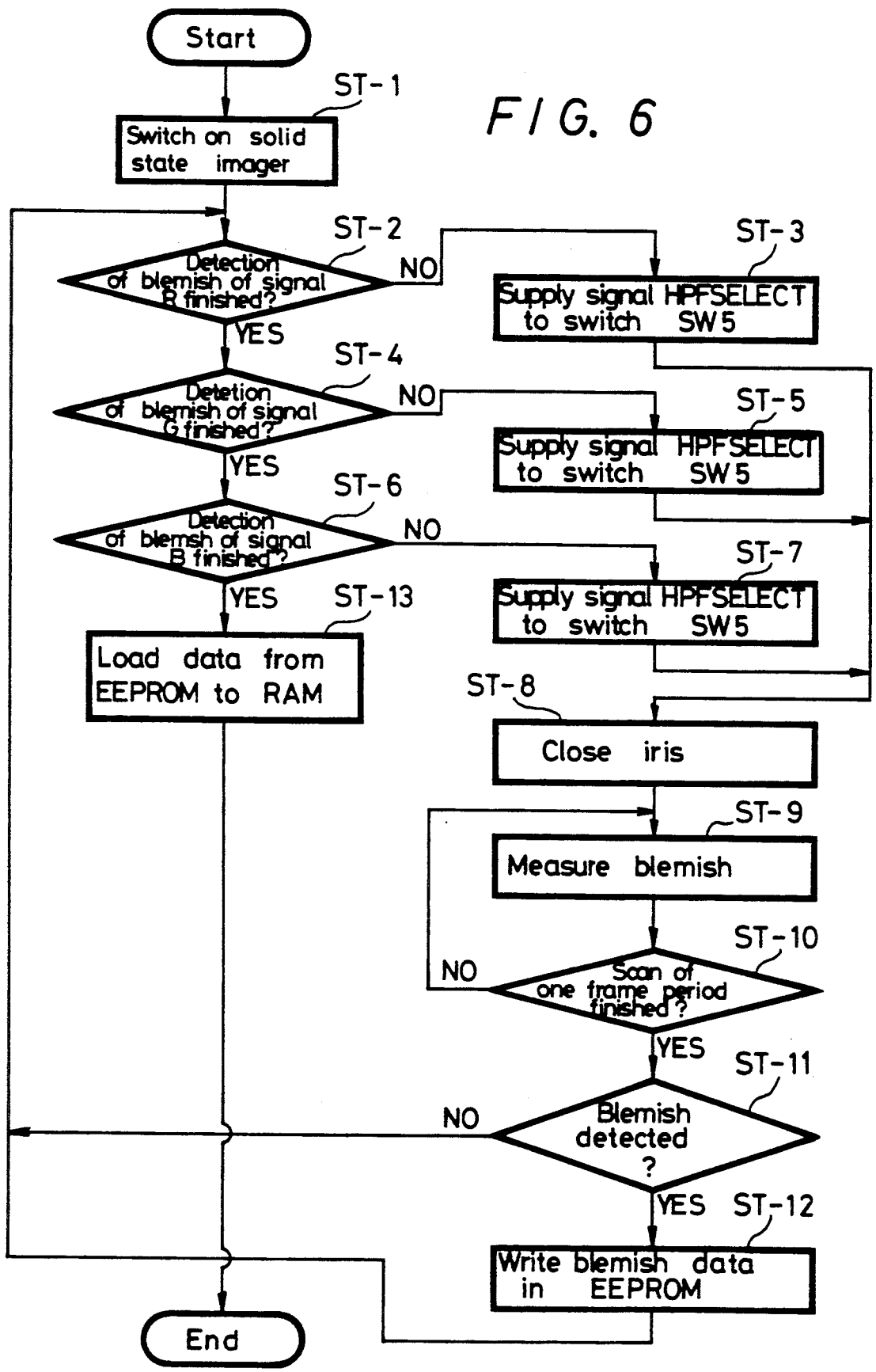

Referring to FIG. 6, following the Start of operation, in step ST-1, the solid state imager is powered, and then the processing proceeds to the next decision step ST-2.

It is determined in decision step ST-2 whether the detection of blemish of the digital video signal R is finished or not. If a YES is output at step ST-2, then the processing proceeds to the next decision step ST-4 and if a NO is output at step ST-2, then the processing proceeds to step ST-3.

In step ST-3, the switch change-over signal HPFSELECT from the control pulse generator 21 shown in FIG. 3 is supplied to the switch SW5 which then selects the digital video signal R, and the processing proceeds to step ST-8.

It is determined in decision step ST-4 whether or not the detection of blemish of the digital video signal G is finished. If a YES is output at step ST-4, then the processing proceeds to the next decision step ST-6, and if a NO is output at step ST-4, then the processing proceeds to step ST-5.

In step ST-5, the switch change-over signal HPFSELECT from the control pulse generator 21 shown in FIG. 3 is supplied to the switch SW5 which then selects the digital video signal G, and then the processing proceeds to step ST-8.

It is determined in decision step ST-6 whether the detection of blemish of the digital video signal B is finished or not. If a YES is output at step ST-6, then the processing proceeds to the final step ST-13, and if a NO is output at step ST-6, then the processing proceeds to the next step ST-7.

In step ST-7, the switch change-over signal HPFSELECT from the control pulse generator 21 shown in FIG. 3 is supplied to the switch SW5 which then selects the digital video signal B, and then the processing proceeds to step ST-8.

In step ST-8, the iris is closed and the processing proceeds to step ST-9.

In step ST-9, the flemish is measured and the processing proceed to the next step ST-10.

It is determined in decision step ST-10 on the basis of the address data from the line counter 19 and the cell counter 20 shown in FIG. 3 whether or not the scanning of one frame is finished. If a YES is output at step ST-10, then the processing proceeds to the next decision step ST-11, and if a NO is output at step ST-10, then the processing returns to step ST-9, whereat the measurement of blemish is continued.

It is determined in decision step ST-11 whether or not the blemish is detected. If a YES is output at step ST-11, then the processing proceeds to step ST-12, and if a NO is output at step ST-11, then the processing returns to step ST-2, and the step ST-2 and the following steps are repeated.

In step ST-12, blemish data detected is written in the EEPROM 24 shown in FIG. 3 and then the processing returns again to the step ST-2.

In the final step ST-13, data stored in the EEPROM 24 is loaded to the RAM 25 shown in FIG. 3 and the processing is ended.

Of the above-mentioned three modes, the defective pixel designating mode will be described briefly with reference to a flowchart forming FIG. 7.

Figure 7:
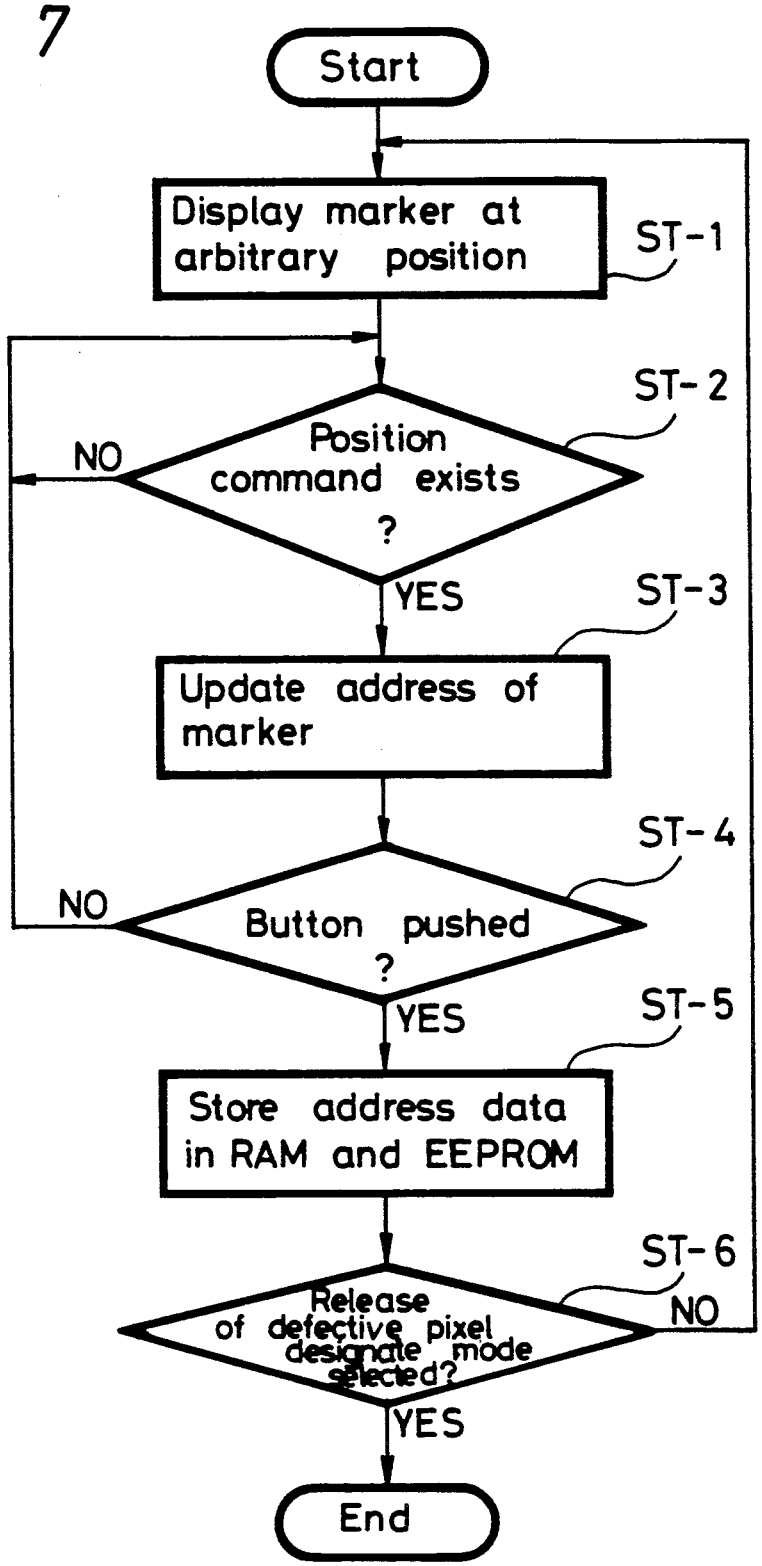
Figure 8:
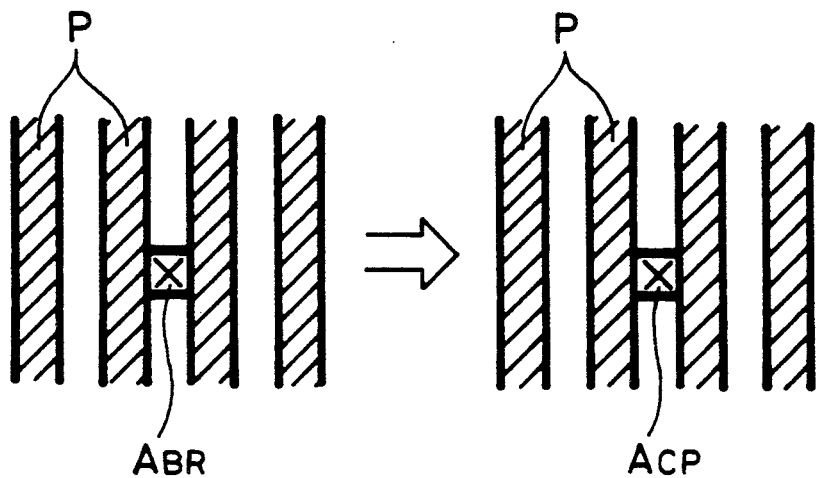
FIG. 8 is a schematic diagram used to explain an interpolation processing done by a conventional image defect correcting circuit for a solid state imager.

Referring to FIG. 7, following the Start of operation, in step ST-1, when the user designates this mode by using the operation unit 29 shown in FIG. 3, the cross-shaped marker generated from the marker generator 26 shown in FIG. 3 is displayed at an arbitrary position of the picture screen of the monitor receiver to which the output video signal from the solid state image pickup apparatus is supplied. Then, the processing proceeds to the next decision step ST-2.

It is determined in step ST-2 by the user by operating the marker controller 27 shown in FIG. 3 whether or not the position command from the marker controller 27, or the address data exists. If a YES is output at step ST-2, then the processing proceeds to the next step ST-3 and if a NO is output at step ST-2, the apparatus is placed in the standby mode for the input.

In step ST-3, each time the user operates the marker controller 27, the address of the cross-shaped marker is updated by the marker generator 26 and the cross-shaped marker is moved on the picture screen of the monitor receiver Then, the processing proceeds to the next decision step ST-4.

In step ST-4, when the user pushes a button or the like after the position of the cross-shaped marker is made coincident with the position of the blemish discovered on the picture screen of the monitor receiver by the user, address data supplied from the marker controller 27 at that time is stored. Then, it is determined whether or not the button is pushed. If a YES is output at step ST-4, the processing proceeds to step ST-5 and if a NO is output at step ST-4, then the processing returns to step ST-2.

In step ST-5, the address data supplied from the marker controller 27 is stored in the RAM 25 and the EEPROM 24 shown in FIG. 3 as the data of the blemish pixel, and then the processing proceeds to the next decision step ST-6.

In step ST-6, a message indicating whether or not the defective pixel designating mode is released is displayed on the display section 28 shown in FIG. 3 for the user and it is determined whether or not the release of the defective pixel designating mode is selected by the user by operating the operation section 29. If a YES is output at step ST-6, then the processing is ended and if a NO is output at step ST-6, then the processing returns to step ST-1.

In the solid state imager provided with the above-mentioned image defect correcting circuit, three modes are available. In the normal camera mode, the defective pixel is interpolated on the basis of the data stored beforehand in the EEPROM 24; in the camera mode for detecting the defective pixel, not only the inspection of the blemish before the solid state imager is bought by the user can be considerably simplified but also data can be additionally provided to the data stored beforehand in the EEPROM 24. Particularly, in the self-test mode which needs no input by the user when the solid state imager is switched ON, the detection and interpolation of the defective pixel can be automatically carried out when the solid state imager is powered. Further, in the defective pixel designating mode, data indicative of blemish visually discovered by the user can be stored in the EEPROM 24, whereby minute white blemish and black blemish also can be interpolated.

In the description of FIG. 3, the image defect correcting circuit in the solid state imager may be provided inside or outside the solid state imager. Further, the microcomputer 23 may be replaced with, for example, a personal computer and this personal computer may be connected via, for example, RS-232C interface to the solid state imager. In that event, the EEPROM 24 may be a floppy disk, a magneto-optical disc or the like when an external storage apparatus is utilized. Furthermore, the above-mentioned image defect correcting circuit can be fabricated as an IC with ease.

According to the above embodiment of the present invention, an image defect correcting circuit for a solid state imager is comprised of comparing means for comparing levels of output signals from respective pixels of a solid state image pickup element illuminated on its whole surface with a light of uniform brightness with a predetermined level, position data generating means for generating data indicative of a position of pixel which outputs a signal of peculiar level on the basis of the compared result of said comparing means, interpolating means for interpolating an output signal output from the pixel located at the position indicated by the position data generated from at least the position data generating means by using an output signal derived from other pixel, and switching means for selectively switching the output signals of the respective pixels and an output signal of the interpolating means on the basis of the output signal from the position data generating means. Therefore, even when blemish occurs in the solid state image pickup element housed in the housing, the blemish occurred in the solid state image pickup element can be interpolated without disassembling the solid state image pickup element from the housing.

A second embodiment according to the present invention will hereinafter be described with reference to FIGS. 9 to 17.

In the second embodiment shown in FIGS. 9 to 17, the present invention is applied to a signal processing system of a so-called three plate-type solid state image pickup apparatus in which a color image is picked up by three solid state image sensors 51R, 51G and 51B on which image pickup screens there are focused object images analyzed in color into red, green and blue three primary colors by an image pickup optical system for image light.

Figure 9:
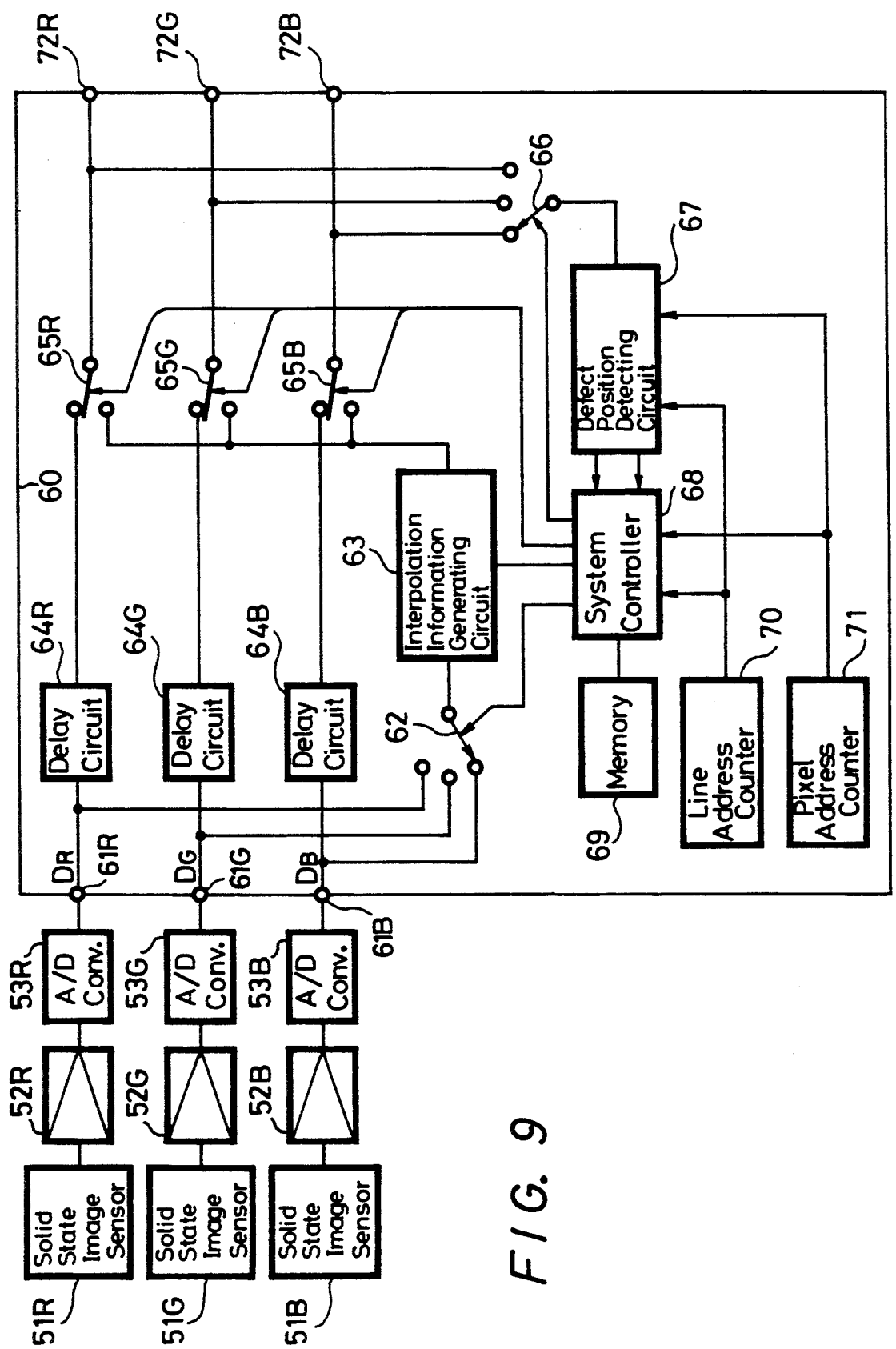
FIG. 9 is a schematic block diagram showing a second embodiment of the image defect correcting circuit for a solid state imager according to the present invention.

As shown in FIG. 9, in the signal processing system of this solid state image pickup apparatus, a red camera output signal from the solid state image sensor 51R for picking up a red image is supplied through a pre-amplifier 52R to an A/D converter 53R, and is thereby converted to a 10-bit digitized red camera data $D_R$, which is then fed to a first input terminal 61R of an image defect correcting circuit 60 according to the present invention. A green camera output signal from a solid state image sensor 51G for picking up a green image is supplied through a pre-amplifier 52G to an A/D converter 53G, and is thereby converted to a 10-bit green camera data $D_G$, which is then fed to a second input terminal 61G of the image defect correcting circuit 60. Further, a blue camera output signal from a solid state image sensor 51B for picking up a blue image is supplied through a pre-amplifier 52B to an A/D converter (53B, and is thereby converted into a 10-bit blue image data $D_B$, which is then fed to a third input terminal 61B of the image defect correcting circuit 60.

Figure 10:
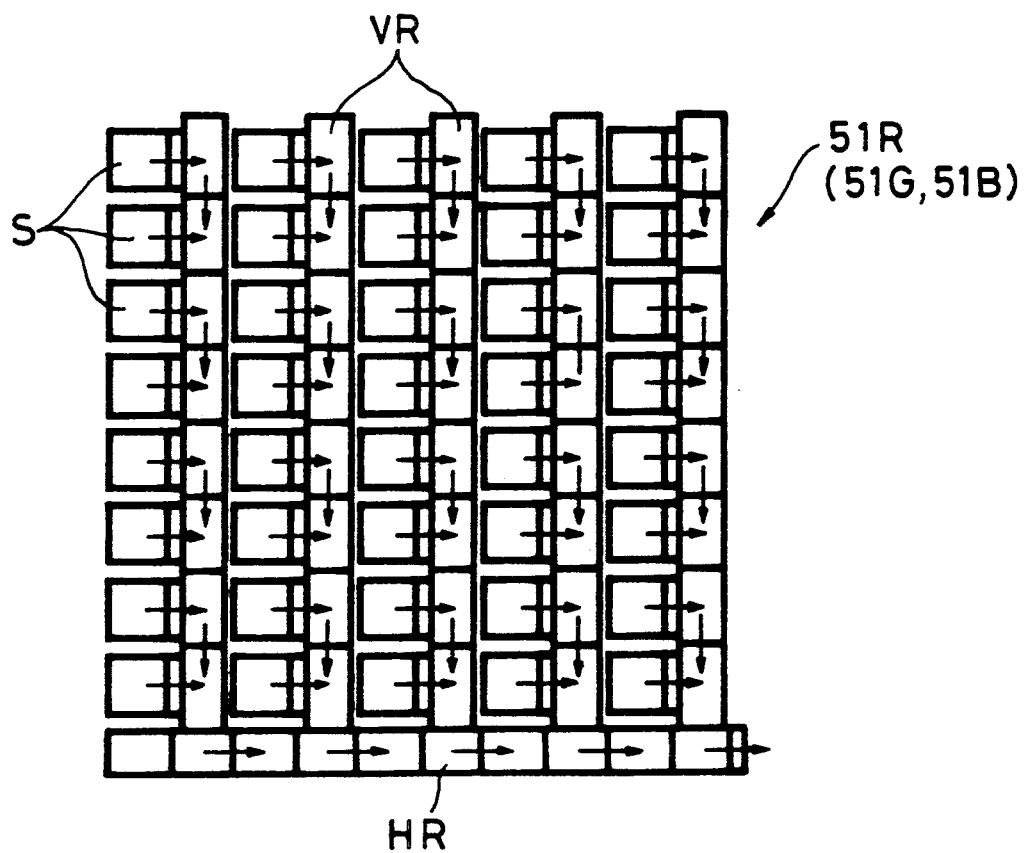
FIG. 10 is a schematic diagram showing a structure of a solid state image pickup element which supplies a video signal to the image defect correcting circuit for a solid state imager of the present invention.

As the above-mentioned solid state image sensor, there is utilized a CCD image sensor of an interline transfer type which comprises as, for example, shown in FIG. 10, a number of light receiving sections S corresponding to respective pixels arrayed in a matrix-fashion, vertical transfer registers VR provided at one side of these light receiving sections S along the longitudinal direction and a horizontal transfer register HR provided at the ends of these vertical transfer registers VR, whereby signal charges obtained from the respective light receiving sections S in response to the light receiving amount are transferred to respective corresponding vertical transfer registers VR at, for example, every one field or at every one frame, the above-mentioned signal charges are transferred to the horizontal register HR through the vertical transfer registers VR and a signal charge from the horizontal transfer register HR at every horizontal line is generated as an image pickup output.

Turning back to FIG. 9, the image defect correcting circuit 60 of this embodiment is comprised of an interpolation information generating circuit 63 to which there are supplied the three primary color image pickup data $D_R$, $D_G$ and $D_B$ from the first to third input terminals 61R, 61G and 61B through a first channel selection switch 62, a first substitute switch 65R to which an interpolation information formed by the interpolation information generating circuit 63 is supplied and to which the red camera data $D_R$ is supplied from the first input terminal 61R through a delay circuit 64R, a second substitute switch 65G to which the interpolation information generated by the interpolation information generating circuit 63 is supplied and to which the green camera data $D_G$ is supplied from the second input terminal 61G through a delay circuit 64G, a third substitute switch 65B to which the interpotion signal is supplied from the circuit 63 and to which the blue camera data $D_B$ is supplied from the third input terminal 61B through a delay circuit 64B, a defect position detecting circuit 67 to which output data from the first to third substitute switches 65R, 65G and 65B are supplied through a second channel selection switch 66, a system controller 68 for controlling operations of the above-mentioned elements, a memory 69, a line address counter 70 and pixel address counter 71 which are connected to the above system controller 68 and so on.

Figure 11:
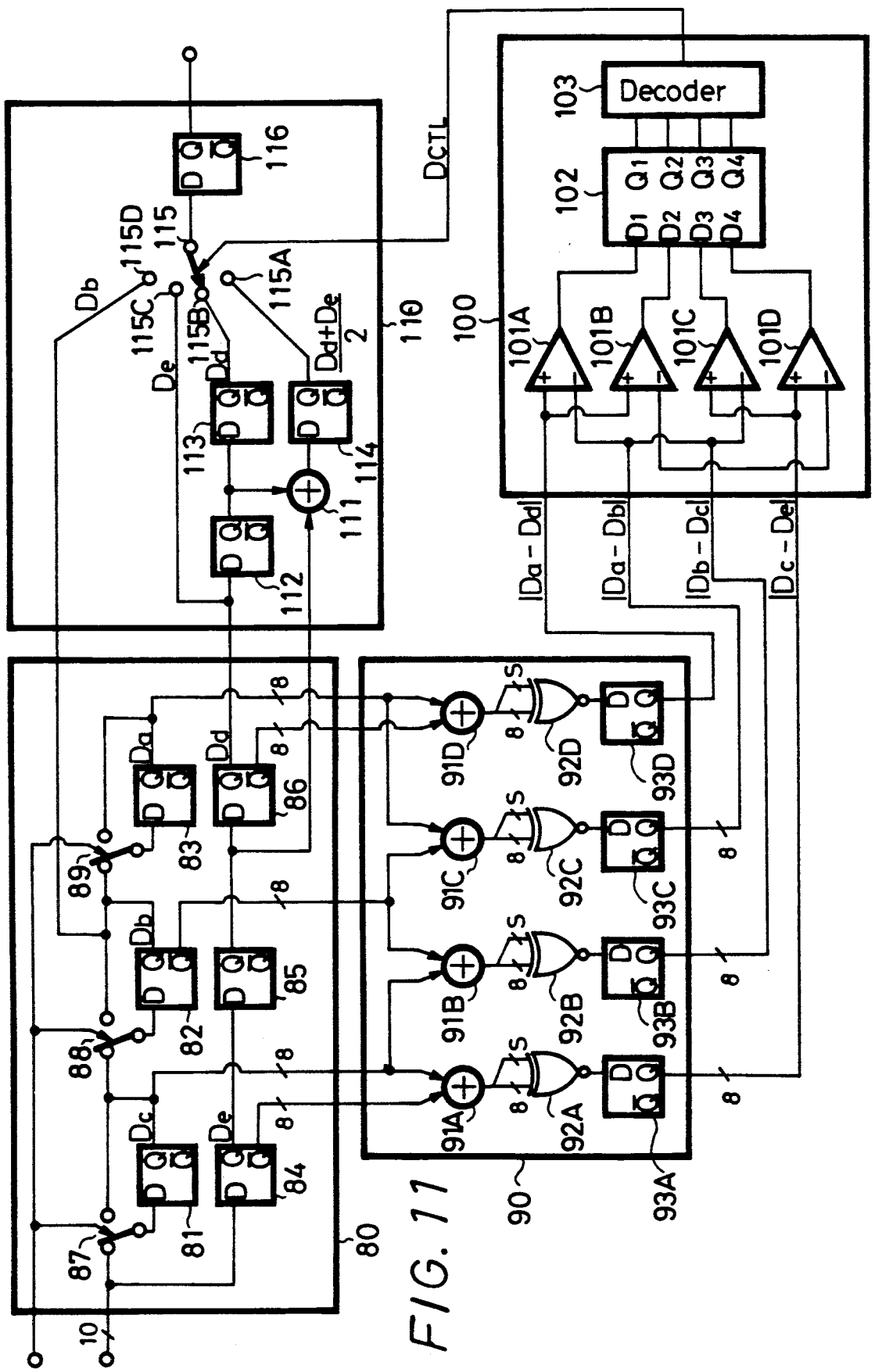
FIG. 11 is a schematic diagram showing in detail an interpolation information generating means used in the image defect correcting circuit for a solid state imager according to the present invention shown in FIG. 9.

The interpolation information generating circuit 63 is comprised of, as shown by a specific arrangement in FIG. 11, a register section 80 which temporarily stores camera data of channel selected by the first channel selection switch 62, an absolute value computing section 90 which calculates an absolute value of level difference between signal levels indicated by the camera data stored temporarily in the register section 80, a comparing section 100 for comparing respective absolute values calculated by this absolute value computing section 90 and an interpolation operaion section 110 for obtaining a video information at the position of the defective pixel by selectively interpolating camera data stored in the register section 80 on the basis of the compared result by the comparing section 100.

The register section 80 is composed of first to third D flip-flops 81, 82 and 83 connected in cascade, fourth to sixth D flip-flops 84, 85 and 86 connected in cascade and input change-over switches 87, 88 and 89 for changing-over inputs of the first to third D flip-flops 81, 82 and 83.

Figure 12:
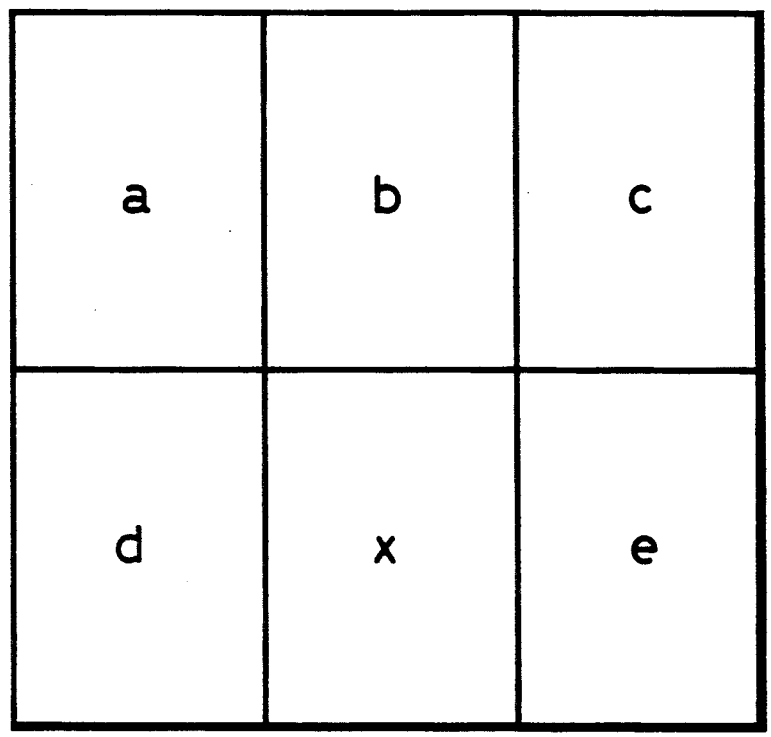
FIG. 12 is a schematic diagram showing the condition of pixels located in the vicinity of a defective pixel of the solid state image pickup element which supplies the video signal to the image defect correcting circuit for a solid state imager shown in FIG. 9.

In the register section 80, the first D flip-flop 81 latches camera data of 10 bits supplied to its data input terminal D through the input change-over switch 87 from the first channel selection switch 62 and feeds its Q output back to the data input terminal D thereof through the input change-over switch 87 to thereby temporarily store the latched data. The second D flip-flop 82 stores the Q output of first flip-flop 81 supplied to its data input terminal D through the input change-over switch 88 and feeds the Q output thereof back to the data input terminal D thereof through the input change-over switch 88 to thereby temporarily store the latched camera data. Further, the third D flip-flop 83 latches the Q output of the second D flip-flop 82 supplied to its data input terminal D through the input change-over switch 89 and feeds the Q output thereof back to the data input terminal thereof through the input change-over switch 89 to thereby temporarily store the latched camera data. In this register section 80, the above input change-over switches 87, 88 and 89 are controlled by the system controller 68, whereby the first to thrid D flip-flops 81, 82 and 83 latches camera output Dc, Db, Da from three nearby pixels c, b, a located one horizontal line before the defective pixel x as shown in FIG. 12 and temporarily store the respective camera output data Dc, Db, Da.

The first D flip-flop 81 supplies the above-mentioned absolute value operation section 90 with upper significant 8-bit data of the camera output data Dc from the pixel c obtained as the Q output thereof. The second D flip-flop 82 supplies the above-mentioned interpolation operation section 110 with the camera output data Db from the pixel b obtained as the Q output thereof and also supplies the absolute value operation section 90 with polarity inverted data $\overline{Db}$ of the camera output data Db obtained as the $\overline{Q}$ output thereof. Further, the third D flip-flop 83 supplies the absolute value operation section 90 with upper significant 8-bit data of the camera output data Da from the pixel a obtained as the Q output thereof.

Further, in this register section 80, the fourth to sixth D flip-flops 84, 85 and 86 latch in a dot-sequential manner the camera data of the channel selected by the first channel selection switch 62 and transfer the same, and respective upper significant 8-bit data of the $\overline{Q}$ outputs of the fourth and sixth D flip-flops 84 and 86 are supplied to the absolute value operation section 90. Also, the respective Q outputs of the fifth and sixth D flip-flops 85 and 86 are supplied to the interpolation operation section 110.

The above-mentioned absolute value operation section 90 is composed of first to fourth adders 91A, 91B, 91C, 91D, first to fourth exclusive NOR circuits 92A, 92B, 92C, 92D supplied with added outputs of these adders 91A, 91B, 91C, 91D and first to fourth D flip-flops 93A, 93B, 93C, 93D supplied at their data input terminals D with outputs of these exclusive NOR circuits 92A, 92B, 92C, 92D.

The first adder 91A adds the Q output of the first D flip-flop 81 and the $\overline{Q}$ output of the fourth D flip-flop 84 in the register section 80. The first exclusive NOR circuit 92A exclusive-NORes the polarity bit S and the data bit of the added output from the first adder 91A, and supplies this exclusive-NORed output to the data input terminal D of the first D flip-flop 93A.

The second adder 91B adds the Q output of the first D flip-flop 81 and the $\overline{Q}$ output of the second D flip-flop 82 in the register section 80. The second exclusive-NOR circuit 92B exclusive-NORes the polarity bit S and the data bit of the added output of the second adder 91B, and supplies an exclusive-NORed output to the data input terminal D of the second D flip-flop 93B.

Further, the third adder 91C adds the $\overline{Q}$ output of the second D flip-flop 82 and the Q output of the third D flip-flop 83 in the register section 80. The third exclusive-NOR circuit 92C exclusive-NORes the polarity bit S and the data bit of the added output of the third adder 91C, and supplies this exclusive-NORed output to the data input terminal D of the third D flip-flop 93C.

The fourth adder 91D adds the Q output of the third D flip-flop 83 and the $\overline{Q}$ output of the sixth D flip-flop 86 in the register section 80. Then, the fourth exclusive-NOR circuit 92D exclusive-NORes the polarity bit S and the data bit of the added output of the fourth adder 91D, and supplies the exclusive-NORed output thereof to the data input terminal D of the fourth flip-flop 93D.

Under the condition such that the fifth D flip-flop 85 in the register 80 latches camera output data Dx of the defective pixel x shown in FIG. 12, the fourth D flip-flop 84 outputs camera output data De from a pixel e adjacent to the defective pixel x and that the sixth flip-flop 86 outputs camera output data Dd from the pixel d adjacent to the above-mentioned defective pixel x, the first to fourth D flip-flops 93A, 93B, 93C and 93D latch absolute value data $|Dc-De|$, $|Db-Dc|$, $|Da-Db|$, $|Da-Dd|$ of differences between camera output data from the pixels a, b, c, d and e located near the defective pixel x obtained as the exclusive-NORed outputs of the exclusive-NOR circuits 92A, 92B, 92C and 92D.

The absolute value operation section 90 supplies the comparing section 100 with the absolute value data $|Dc-De|$, $|Dc-Db|$, $|Da-Db|$ and $|Da-Dd|$ latched in first to fourth D flip-flops 93A, 93B, 93C, and 93D.

This comparing section 100 is composed of first to fourth comparators 101A, 101B, 101C, 101D to which the absolute value data $|Dc-De|$, $|Dc-Db|$, $|Da-Db|$, $|Da-Dd|$ from the absolute value operating section 90, a D flip-flop 102 which latches compared outputs of the first to fourth comparators 101A, 101B, 101C, 101D and a decoder 103 which decodes a latched output from the D flip-flop 102.

The first comparator 101A compares the absolute value data $|Da-Dd|$ and $|Da-Db|$ from the absolute value operating section 90, and supplies its compared output to a first data input terminal D1 of the D flip-flop 102. The compared output of the first comparator 101A goes logic [H] (high) level when $|Da-Dd| > |Da-Db|$ and goes logic [L] (low) level when $|Da-Dd| < |Da-Db|$.

The second comparator 101B compares the absolute value data $|Da-Dd|$ and $|Db-Dc|$ supplied thereto from the absolute value operating section 90 and supplies its compared output to a second data input terminal D2 of the D flip-flop 102. The compared output of this second comparator 102 goes logic [H] level when $|Da-Dd| > |Db-Dc|$ and goes logic [L] level when $|Da-Dd| < |Db-Dc|$.

Further, the third comparator 102 compares the absolute value data $|Dc-De|$ and $|Da-Db|$ supplied thereto from the absolute value operating section 90 and supplies its compared output to a third data input terminal D3 of the D flip-flop 102. The compared output of the third comparator 101C goes logic [H] level when $|Dc-De| > |Da-Db|$ and goes logic [L] level when $|Dc-De| < |Da-Db|$.

The fourth comparator 101D compares the absolute value data $|Dc-De|$ and $|Db-Dc|$ supplied thereto from the above absolute value operating section 90 and supplies its compared output to a fourth data input terminal D4 of the D flip-flop 102. The compared output of the fourth comparator 101D goes logic [H] level when $|Dc-De| > |Db-Dc|$ and goes logic [L] level when $|Dc-De| < |Db-Dc|$.

In the comparing section 100, the decoder 103 decodes the latched outputs Q1, Q2, Q3 and Q4 obtained from the D flip-flop 102 which latches the compared outputs of the first to fourth comparators 101A, 101B, 101C and 101D in accordance with a decoding fashion shown in FIG. 13 to thereby generate a selection control signal $D_{CTL}$.

The selection control signal $D_{CTL}$ from the comparing section 100 is supplied to the interpolation information selecting section 110.

It will be seen in FIG. 11 that the interpolation information selecting section 110 is composed of an adder 111 which is supplied with the Q output of the fifth D flip-flop 85 in the register section 80, a first D flip-flop 112 which is supplied at its data input terminal D with the Q output of the sixth flip-flop 86 in the register section 80, a second D flip-flop 113 which is supplied at its data input terminal D with the Q output of the first D flip-flop 112, a third D flip-flop 114 which is supplied at its data input terminal D with the added output of the adder 111, a change-over switch 115 which is controlled by the selection control data $D_{CTL}$ from the comparing section 100 and a fourth D flip-flop 116 which is supplied at its data input terminal D with the interpolation output selected by the change-over switch 115.

The adder 111 adds the Q output of the first D flip-flop 112 and the Q output of the fifth D flip-flop 85 in the register section 80.

The change-over switch 115 is supplied at its first input terminal 115A with the added output of the adder 111 through the third D flip-flop 114. The data supplied to the first input terminal 115A is output through the fourth D flip-flop 116 as mean value interpolation data $D_{AV}$ which is provided as $$D_{AV} = \frac{D_d + D_e}{2}$$

by using camera output data Dd and De provided by the two pixels d and e adjacent to the above-mentioned defective pixel x.

The change-over switch 115 is supplied at its second input terminal 115B with the Q output of the first D flip-flop 112 through the second D flip-flop 113. The data supplied to the second input terminal 115B of the change-over switch 115 is output through the fourth D flip-flop 116 as 0-order hold interpolation data utilizing the camera output data provided by the pixel d located adjacent to the above defective pixel x.

The change-over switch 115 is supplied at its third input terminal 115C with the Q output of the sixth flip-flop 86 in the register section 80. The data supplied to the third input terminal 115C of the change-over switch 115 is output through the fourth D flip-flop 116 as 0-order hold interpolation data utilizing the camera output data De provided by the pixel e located adjacent to the above defective pixel x.

Furthermore, the change-over switch 115 is supplied at its fourth input terminal 115D with the Q output of the second D flip-flop 82 in the register section 80. The data supplied to the fourth input terminal 115D of the change-over switch 115 is output through the fourth D flip-flop 116 as 0-order hold interpolation data utilizing the camera output data Db provided by the pixel b located one horizontal line before the above-described defective pixel x.

Figure 14A:
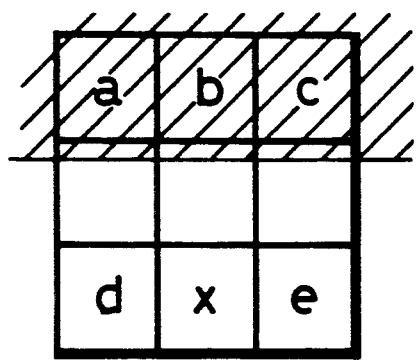
FIGS. 14A and 14B are diagrams schematically showing stripe patterns in the horizontal direction picked up by the pixels near the defective pixel of the solid state image pickup element shown in FIG. 12, respectively.
Figure 14B:
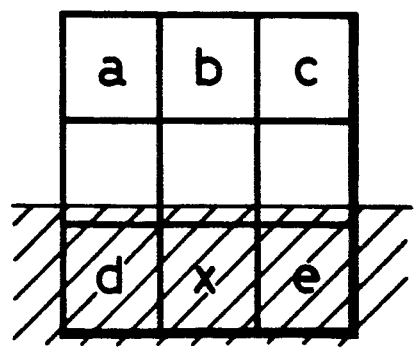

In the thus arranged interpolation information generating circuit 63, when an object image picked up by the pixels a, b, c, d, e located near the defective pixel x is a stripe pattern extending in the horizontal direction as shown in FIGS. 14A and 14B, the interpolation information selecting section 110 is controlled such that the change-over switch 115 is connected to the first input terminal 115A by the selection control signal Mn derived from the decoder 103 of the comparing section 100, thereby the mean value interpolation data $D_{AV}$ provided by the camera output data Dd and De from the two pixels d and e adjacent to the defective pixel x being output as correction data of the camera output data Dx of the defective pixel x.

When an object image picked up by the respective pixels a, b, c, d and e is a stripe pattern which is oriented upper left as shown in FIGS. 15A, 15B and 15C, the interpolation information selecting section 110 is controlled such that the change-over switch 115 is connected to the second input terminal 115B by the selection control signal $M_L$ derived from the decoder 103 of the comparing section 100, thereby the camera output data Dd provided by the pixel d located adjacent to the defective pixel x being output as correction data of the camera output data Dx of the defective pixel x.

Further, when an object image picked up the respective pixels a, b, c, d and e is a stripe pattern which is oriented in the upper right as shown in FIGS. 16A, 16B and 16C, the above-mentioned interpolation information selecting section 110 is controlled such that the change-over switch 115 is connected to the third input terminal 115C by the selection control signal $M_R$ derived from the decoder 103 of the comparing section 100, thereby the camera output data De provided by the pixel e located adjacent to the defective pixel x being output as correction data of the camera output data Dx of the defective pixel x.

Furthermore, when an object image picked up by the respective pixels a, b, c, d and e located near the defective pixel x is a stripe pattern which is oriented in the vertical direction as shown in FIGS. 17A and 17B, the interpolation information selecting section 110 is controlled such that the change-over switch 115 is connected to the fourth input terminal 115D by the selection control signal $M_V$ derived from the decoder 103 of the comparing section 100, thereby the camera output data Db provided by the pixel b located one horizontal line before the defective pixel x being output as correction data of the camera output data Dx of the defective pixel x.

In the image defect correcting circuit 60 of this embodiment shown in FIG. 9, the first channel selection switch 62 is controlled by the system controller 68 in such a fashion that defective pixel position data indicative of positions of defective pixels involved in the respective solid state image sensors 51R, 51G and 51B are read out of the memory 69 together with the identifying data of the respective solid state image sensors 51R, 51G, and 51B and camera output data of channel including the camera output data Dx of the defective pixel x is selectively supplied to the interpolation information generating circuit 63. Also, the first to third substitute switches 65R, 65G and 65B are selectively controlled such that the camera output data Dx provided by the defective pixel x is replaced with the interpolation data D generated by the interpolation information generating circuit 63.

Incidentally, the positions of the defective pixels involved in these solid state image sensors 51R, 51G and 51B are detected beforehand by the defective pixel detecting section 67 to which the camera output data $D_R$, $D_G$ and $D_B$ from the solid state image sensors 51R, 51G and 51B are supplied through the second channel selection switch 66, and the defective pixel position data are stored in the above-mentioned memory 69 together with identifying data of the solid state image sensors 51R, 51G and 51B.

Figure 18:
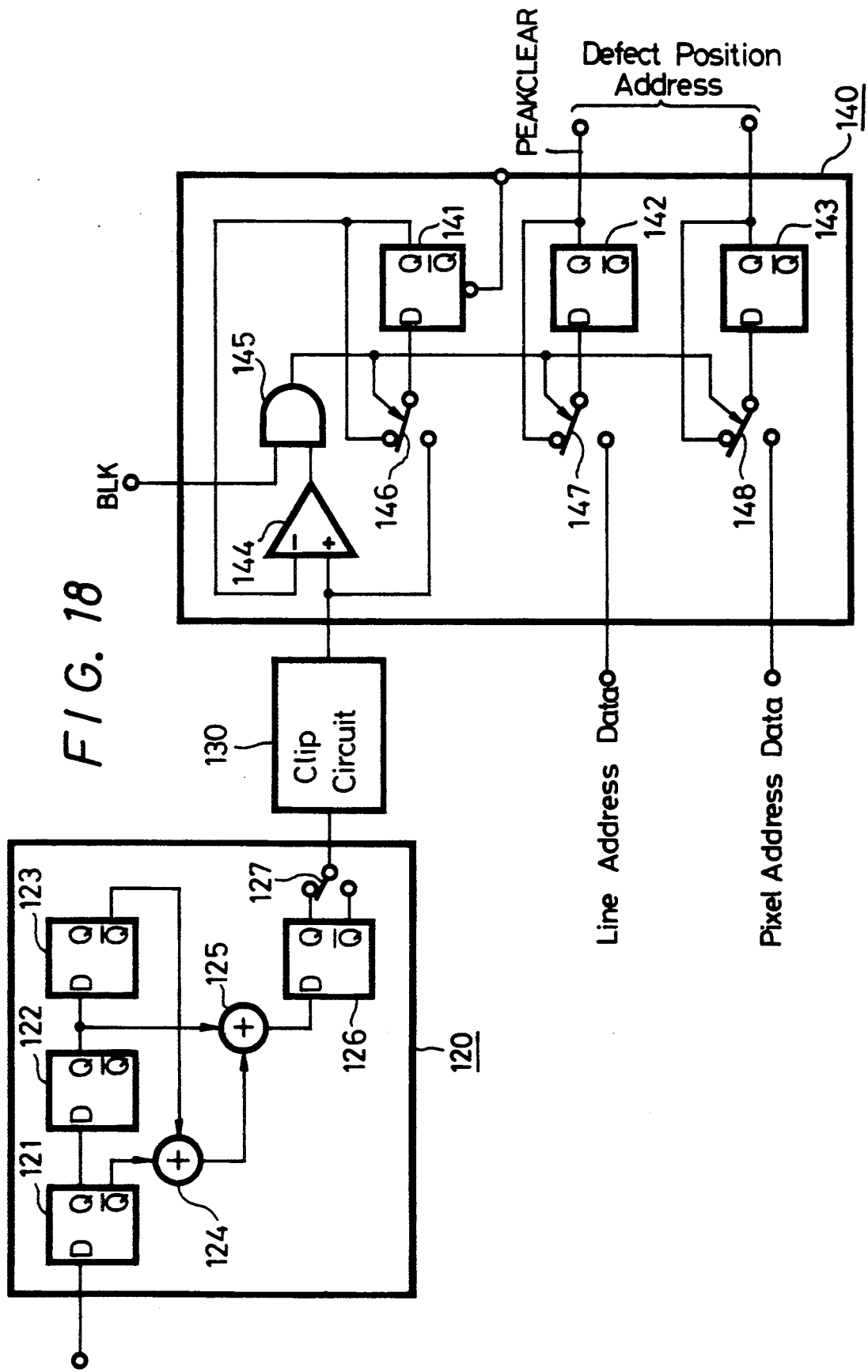
FIG. 18 is a block diagram showing in detail a defect position detecting means used in the image defect correcting circuit for a solid state imager shown in FIG. 9.

FIG. 18 shows in block form a specific arrangement of the defective pixel detecting section 67. As shown in FIG. 18, the defective pixel detecting section 67 is generally composed of a high-pass filter section 120 a clipping processing section 130 and a defective position detection processing section 140.

The high-pass filter section 120 is comprised of D flip-flops 121, 122 and 123 of three stages and two adders 124 and 125, a D flip-flop 126 at output stage, and a switch 127 to thereby derive transfer function H (z) expressed as $$H(z) = -z^{-1} + 2z^0 - z^1$$

Q output and $\overline{Q}$ output of the D flip-flop 126 at the output stage can be selectively output by way of the switch 127. This switch 127 is controlled by the above-mentioned system controller 68 so as to select the Q output when the defect of white blemish is detected and to select the $\overline{Q}$ output when the defect of black blemish is detected.

The image data whose DC component and whose low band component are eliminated by the high-pass filter section 120 is clipped in its negative side by the clipping processing section 130 and fed to the defect position detection processing section 140.

As shown in FIG. 18, the defect position detection processing section 140 is composed of a first D flip-flop 141 which temporarily stores image data supplied from the clipping processing section 130, a second D flip-flop 142 which temporarily stores line address data supplied from the line address counter 70, a third D flip-flop 143 which temporarily stores pixel data supplied from the pixel address counter 71, a comparator 144 which compares the image data temporarily stored in the first D flip-flop 141 with the image data supplied from the clipping processing section 130 and first to third change-over switches 146, 147 and 148 to which a compared output from the comparator 144 is supplied through an AND gate circuit 145 as a switching control signal.

The first D flip-flop 141 is operated as a maximum value detector which selectively latches image data larger than the image data previously latched when the image data is supplied to the data input terminal through the first change-over switch 146 whose switching operation is controlled by the compared output of the above-mentioned comparator 144. Thus, it is possible to detect image data of the defective pixel which outputs the camera signal of the maximum signal level.

Then, the second D flip-flop 142 latches line address data supplied to the data input terminal thereof through the second change-over switch 147 which is changed in position together with the first change-over switch 146 by the compared output of the comparator 144. Consequently, the line address data indicative of the position of the defective pixel is latched in the second D flip-flop 142.

The third D flip-flop 143 latches pixel address data supplied to the data input terminal thereof through the third change-over switch 148 which is changed in position together with the first change-over switch 146 by the compared output from the comparator 144. Thus, the pixel data indicative of the position of the defective pixel is latched in the third D flip-flop 143.

The line address data and the pixel data latched in the second and third D flip-flops 142 and 143 are written in the memory 69 through the system controller 68 as the defective pixel position data together with data indicative of the channel selected at that time.

While performing the defect correcting process by using the defective pixel position data written in the memory 69, the above-mentioned defective position detecting and processing section 140 sequentially detects the positions of the defective pixels which present a peculiar signal level.

As described above, according to the second embodiment of the image defect correcting circuit of the present invention, the levels of video signals output from a plurality of pixels located near the defective pixel are compared with each other to thereby discriminate the pattern of the object image near the defective pixel and the video information at the position of the defective pixel is obtained by the interportion on the basis of the video information of the pixels selected in response to this pattern. Therefore, it is possible to perform the interpolation processing in which a portion whose defective portion is corrected can be prevented from becoming conspicuous.

Let us explain next a video image defect correcting circuit of the solid state image pickup apparatus which corrects the signal level of the camera output when a constant bias voltage is always applied to the camera output responsive to the amount of incident light due to the crystal defect of a solid state imager element.

Conventionally, in the blemish correcting circuit which corrects the signal level of the output signal from the solid state imager element, data indicative of the position of defective pixel involved in the solid state imager element and data concerning blemish level contained in the output signal from the solid state imager element are stored beforehand in the memory, and on the basis of the data read out from this memory, the deterioration of image quality due to the camera output from the above-mentioned defective pixel is corrected by the signal processing. The data indicative of the position of the defective pixel involved in the solid state imager element and the blemish level are detected beforehand by the production line and those data are written in a programmable read only memory.

Incidentally, in the conventional blemish correcting circuit, the position data of defective pixel involved in the solid state imager element and the blemish level thereof are detected beforehand and the correction processing is performed by using the programmable read only memory in which the above data are written. As a consequence, when the blemish level is changed in an aging change fashion or when a new defective pixel occurs, there is then the disadvantage that the proper blemish correction processing cannot be effected.

Therefore, in order to eliminate the aforenoted disadvantages of the prior-art blemish correcting circuit, the present invention is intended to provide a blemish correcting circuit or a third embodimemnt of the video image correcting circuit which corrects the signal level of the output signal from the defective pixel. According to the third embodiment of the present invention, even when the blemish level is changed in an aging change manner or when a new defective pixel occurs, a proper blemish correction processing can be effected.

A third embodiment of the video image correcting circuit of the solid state imager according to the present invention will be described with reference to the drawings.

Figure 19:
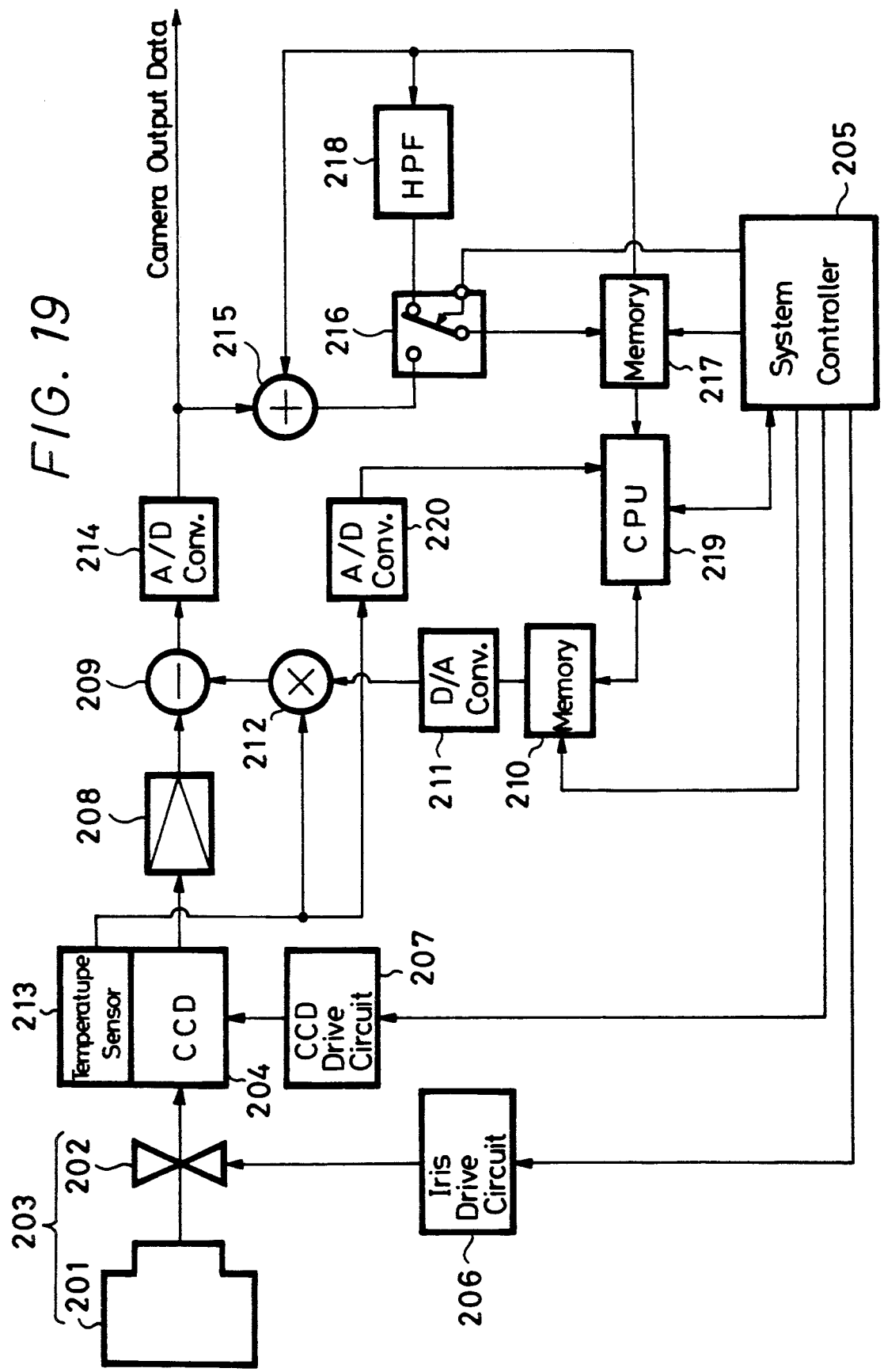
FIG. 19 is a block diagram showing a third embodiment of the image defect correcting circuit for a solid state imager according to the present invention.

In the third embodiment illustrated in FIG. 19, the present invention is applied to a solid state image sensor 204 in which an object image is focused on a target screen by an image pickup light introduced thereto through a camera optical system 203 such as a camera lens 201, an iris mechanism 202 and so on.

In this solid state imager, the iris mechanism 202 of the above-mentioned camera optical system 203 carries out the control of the amount of the image pickup light illuminated on the target screen of the above-mentioned solid state image sensor 204. This iris mechanism 202 is opened and/or closed by an iris drive section 206 which is operated in response to an iris control signal from a system controller 205.

Further, the CCD image sensor 204 is driven by a CCD driver section 204 to which a CCD control signal is supplied from the system controller 205 and picks up images in the operation mode designated by the system controller 205.

Herein as the solid state image sensor 204, it is possible to employ a CCD image sensor of interline transfer type which is comprised of as, for example, shown in FIG. 10, a number of light receiving sections S corresponding to respective pixels arrayed in a matrix fashion, the vertical transfer registers VR provided on one side of these light receiving section S along the longitudinal direction and the horizontal transfer register HR provided at the end sides of these vertical transfer registers VR. In this CCD image sensor, signal charges obtained from the respective light receiving sections S in response to the amount of light received are transferred to the vertical transfer registers VR corresponding to every vertical lines at, for example, every field period or at every frame period and the signal charges are transferred to the horizontal transfer register HR through the respective vertical transfer registers VR, whereby the signal charge of every horizontal line is produced from this horizontal transfer register HR as a camera output.

The blemish correcting circuit, which is provided as the video image defect correcting circuit in this embodiment, includes a signal subtracter 209 to which the camera output from the CCD image sensor 204 is supplied through a pre-amplifier 208.

This signal subtracter 209 is supplied with a blemish correcting signal through a multiplier 212, and this blemish correcting signal results from converting blemish correcting data read out from a first memory 210 into analog blemish correcting signal by a digital-to-analog (D/A) converter 211. Data write and read of a first memory 210 is controlled by the system controller 205. This blemish correcting signal is subtracted from the camera output signal of the CCD image sensor 204, thereby the blemish correction processing being performed.

The multiplier 212 is supplied with a detection output signal from a temperature sensor 213 which detects the temperature of the CCD image sensor 204, that is, a detection output signal indicating the present temperature of the CCD image sensor 204. This detection output signal is multiplied with the analog blemish correction signal from the D/A converter 211, whereby the blemish correction signal is corrected in temperature.

A subtracted output signal from the signal subtracter 209 is digitized by an A/D converter 214, and fed to a digital signal processing section of the succeeding stage (not shown) as the camera output data and to an adder 215.

The adder 215 supplies its added output data through a change-over switch 216 to a second memory 217 whose write and read of data are controlled by the system controller 205.

Data read out of the second memory 217 is supplied to the adder 215 and is also supplied through a high-pass filter 218 to the change-over switch 216. Further, this second memory 217 is utilized as a working memory of a computing apparatus 219 which generates blemish correcting data indicative of the position and the peculiar level of the pixel of pixels of the CCD image sensor 204 and which outputs the signal of peculiar level under the condition that a light is not incident thereon. The second memory 217 is connected to the above computing apparatus 219.

Further, the detection output signal indicative of the current temperature of the CCD image sensor 204 is supplied from the temperature sensor 213 to an analog-to-digital (A/D) converter 220, in which it is converted into a digital signal and fed to the computing apparatus 219.

In the case of the blemish detection mode, the system controller 205 supplies the iris drive section 206 with the iris control signal which closes the iris mechanism 202 that controls the amount of light illuminated on the target screen of the solid state image sensor 204, and also supplies the CCD drive section 207 with the CCD control signal which designates the frame read-out mode of the CCD image sensor 204. In the blemish detection mode, the read out of the first memory 210 is controlled by the system controller 205, thereby reading out from the first memory 210 blemish correction data whose correction level is zero, thus the blemish correction processing being ended.

The camera output signal from the defective pixel obtained from the CCD image sensor 204 under the condition that the iris mechanism 202 is closed increases its signal level, i.e., blemish level in proportion to the charge accumulation time in the above-mentioned defective pixel.

Therefore, in the blemish correcting circuit of this embodiment, the system controller 205 controls the CCD drive section 207 to extend the charge accumulation time so that the charge is accumulated in a range which does not exceed the dynamic range of the circuit.

Further, in the blemish detecting mode, the system controller 205 controls the change-over switch 216 so as to select the adder 215, and the system controller 205 writes the camera output data from the A/D converter 214 in the second memory 217 in synchronism with the read-out of the camera output signal from the CCD image sensor 204. Further, the system controller 205 read out the camera output data written in the second memory 217, the read-out camera output data is synchronously added with camera output data from the A/D converter 214 by the adder 215 and the added result is repeatedly written in the second memory 217, thereby improving a S/N ratio.

Then, the system controller 205 controls the change-over switch 216 so as to select the high-pass filter 218. Camera output data is read out of the second memory 217 and written in the second memory 217 via the high-pass filter 218. In other words, the camera output data whose DC component and whose low band noise component are eliminated by the high-pass filter 218 is written in the second memory 217.

On the basis of the camera output data thus written in the second memory 217, the system controller 205 controls the above computing apparatus 219 such that the computing apparatus 219 performs the computing processing to generata position data indicative of the position of defective pixel which outputs a signal of peculiar level under the condition that no light is illuminated and blemish level data indicative of the peculiar level of the signal output from the defective pixel indicated by the position data.

The above-described computing apparatus 219 responds to a temperature at which the charge accumulation time of the CCD image sensor 204, the number of synchronizing addition and the above-mentioned camera output data are stored in the second memory 217 to perform the computing processing to normalize the camera output data written in the second memory 217, thereby generating the blemish level data together with the position data. The blemish level data generated from the computing apparatus 219 are written in the first memory 210 as the blemish correction data together with the position data under the control of the system controller 205.

Then, in the blemish correcting circuit of this embodiment, the blemish correction data written in the first memory 210 in the blemish detection mode is read out from the first memory 210 and converted to analog data by the D/A converter 211 so that, when the user takes a picture in actual practice, a blemish correction signal is generated and the blemish correction processing is carried out by the signal subtracter 209.

Incidentally, in accordance with the blemish correcting circuit of this embodiment, by utilizing a frame memory as the second memory 217, blemish data can be written in the first memory 210 by one operation. When a line memory is utilized as the second memory 217, the blemish correction data may be written in the first memory 210 by operation more than the number of lines. Furthermore, blemish may be detected at every point by utilizing a register as shown in a fourth embodiment of the present invention shown in FIG. 20.

Figure 20:
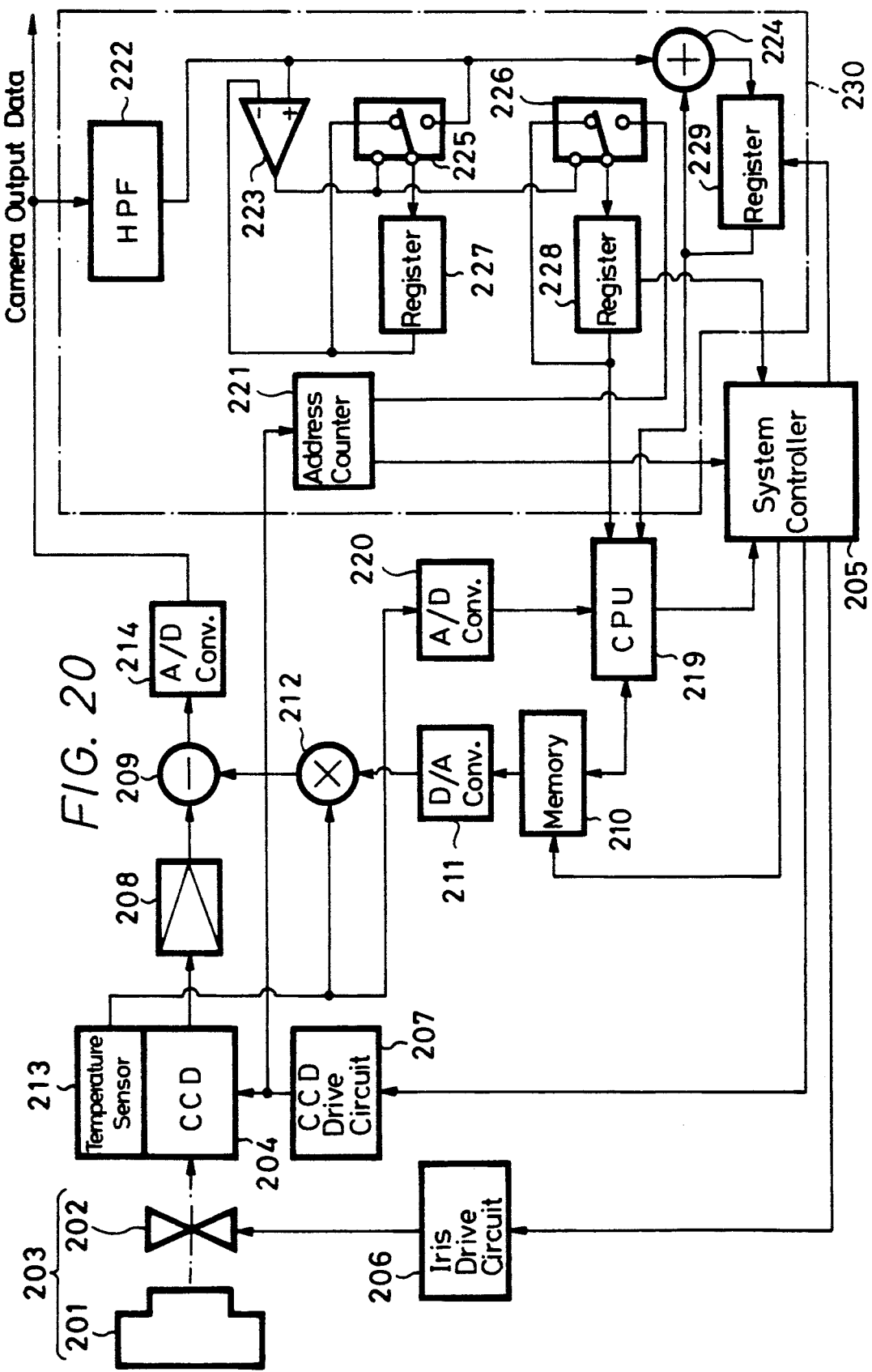
FIG. 20 is a block diagram showing a fourth embodiment of the image defect correcting circuit for a solid state imager according to the present invention.

The embodiment of FIG. 20 is different from the embodiment of FIG. 19 only in the arrangement of a blemish detecting section 230, and common constituents in FIG. 20 are marked with the same references, thereby the detailed arrangement need not be made.

The blemish detecting section 230 in the embodiment shown in FIG. 20 is composed of an address counter 221 for counting the number of clocks from the CCD drive section 207 to generate address data corresponding to respective pixels of the CCD image sensor 204, a high-pass filter 222 to which digital camera output data, which results from converting the camera output signal from the CCD image sensor 204 by the A/D converter 214, is supplied, a comparator 223 and an adder 224 to which the camera output data is supplied through the high-pass filter 222, first and second switches 225 and 226 which are changed in position by an output from the comparator 223, a first register 227 which temporarily stores the camera output data supplied from the high-pass filter 222 through the first switch 225, a second register 228 for temporarily storing address data supplied from the address counter 221 through the second switch 226, and a third register 229 for temporarily storing added output data from the adder 224.

In the blemish correcting circuit in this embodiment, in the blemish detection mode, the system controller 205 causes the CCD image sensor 204 to operate in the frame read-out mode under the condition that the iris mechanism 202 is closed.

Then, the comparator 223 in the blemish detecting section 230 compares the current camera output data supplied through the high-pass filter 222 with the camera output data previously stored in the first register 227. When the current camera output data is larger than the camera output data previously stored in the first register 227, the comparator 223 changes the first switch 225 in position so that the current camera output data is stored in the first register 227, and changes the second switch 226 in position such that the address data indicative of the pixel position of the CCD image sensor 204 which generates the above present camera output is stored in the second register 228.

More precisely, the first switch 225, changed in position by the comparator 223, and the first register 227 which stores the camera output data supplied through the first switch 225 are operated as a peak level detector which detects the peak level of the camera output data supplied through the high-pass filter 222. Further, the second switch 226, changed in position by the comparator 223, and the second register 228 which stores address data supplied from the address counter 221 through the second switch 226 are operated as a detector which detects the pixel which produces the peak level data stored in the first register 227, that is, the position of the defective pixel.

Address data indicating the defective pixel position at which the above-mentioned camera output data takes a peak value is stored in the second register 228. The address data indicating the defective pixel position is supplied to the system controller 205 and the computing apparatus 219.

Since the data latching timing of the third register 229 which temporarily stores added output data of the adder 224 is controlled by the system controller 205, the third register 229 latches camera output data, which are derived from the defective pixel indicated by the address data latched in the second register and which are added by the adder 224 in a synchronizing fashion, to thereby generate camera output data whose S/N ratio is improved. Camera output data obtained in the third register 229 is supplied to the above-mentioned computing apparatus.

If it is determined by the computing apparatus 219 that the camera output data obtained at the third register 229 is sufficiently larger than the noise level, this computing apparatus 29 responds to a temperature at which the charge accumulation time of the CCD image sensor 204, the number of addition performed in a synchronizing fashion, and the camera output data are latched in the second memory 217 to normalize the camera output data obtained at the third register 229, thereby blemish level data being generated. The blemish level data obtained by the computing apparatus 229 is written in the first memory 210 together with the position data of the defective pixel indicated by the address data latched in the second register 228 as blemish correction data.

The blemish correction data written in the first memory 210 is read out from the first memory 210 and converted into the analog data by the D/A converter 211, thereby forming a blemish correction signal. Therefore, while executing the blemish correction processing, the above-mentioned blemish detection mode is repeatedly carried out until the camera output data obtained in the third register 229 becomes less than the noise level, The blemish correction data thus written in the first memory 210 in the blemish detection mode is read out from the first memory 210 and converted into the analog data by the D/A converter 211 so that, in the actual camera mode, the blemish signal is generated and the blemish correction processing is executed by the signal subtracter.

As described above, in the image defect correcting circuit according to the present invention, of the respective pixels of the image pickup elements, the position data indicating the position of the pixel which outputs the signal of the peculiar level under the condition that no light is incident thereon and the blemish data indicating the peculiar level are generated and stored in the memory means. In the actual camera mode, on the basis of the output signal from the memory means, the signal of the level indicated by the blemish level data is subtracted from the output signal of the pixel of the position indicated by the above-mentioned position data, thereby correcting the signal level of the output signal from the pixel included in the solid state image pickup element such as the CCD or the like and which outputs the signal of the peculiar level under the condition that no light is incident. In addition, when the blemish level of the image pickup element is changed in an aging change fashion or when new defective pixel occurs, the proper blemish correction processing can be effected.

Having described preferred embodiments of the invention with reference to the accompanying drawings, it is to be understood that the invention is not limited to those precise embodiments and that various changes and modifications thereof could be effected by one skilled in the art without departing from the spirit or scope of the novel concepts of the invention as defined in the appended claims.

We claim as our invention:

1. An image defect correcting circuit for a solid state imager, comprising:
   a) comparing means for comparing levels of output signals from respective pixels of a solid state image pickup element illuminated on its whole surface with a light of uniform brightness with a predetermined level;
   b) position data generating means for generating position data indicative of a position of pixel which outputs a signal of a peculiar level on the basis of the compared result of the comparing means;
   c) interpolating means for interpolating an output signal output from a pixel located at the position indicated by the position data by using an output signal derived from another pixel and generating an interpolated output signal; and
   d) switching means for selectively switching between the output signals of the respective pixels and the interpolated output signal of the interpolating means on the basis of the position data.

2. An image defect correcting circuit for a solid state imager according to claim 1, wherein the position data generating means generates position data indicative of a position of a pixel which outputs the signal of a peculiar level when the image defect correcting circuit is connected to a power supply source.

3. An image defect correcting circuit for a solid state image according to claim 1, further comprising:
   a) an iris for controlling an amount of light incident on the solid state image pickup element; and
   b) iris control means for controlling the iris, the iris control means closing the iris when the position data generating means generates the position data.

4. An image defect correcting circuit for a solid state imager, comprising:
   a) comparing means for comparing levels of output signals from respective pixels of a solid state image pickup element illuminated on its whole surface with a light of uniform brightness with a predetermined level;
   b) position data generating means for generating data indicative of a position of a pixel which outputs a signal of a peculiar level on the basis of the compared result of the comparing means;
   c) memory means for storing position data derived from at least the position data generating means;
   d) interpolating means for interpolating an output signal output from the pixel located at the position indicated by the position data read out from the memory means by using an output signal of another pixel and generating an interpolated output signal; and
   e) switching means which produces an output signal by selectively switching between output signals of respective pixels and the interpolated output signal of the interpolating means on the basis of the position data.

5. An image defect correcting circuit for a solid state imager according to claim 4, wherein the position data generating means generates position data indicative of a position of the pixel which outputs the signal of a peculiar level when the image defect correcting circuit is powered.

6. An image defect correcting circuit for a solid state imager according to claim 4, further comprising:
   a) an iris for controlling an amount of light incident on the solid state image pickup element; and
   b) iris control means for controlling the iris, the iris control means closing the iris when the position data generating means generates the position data.

7. An image defect correcting circuit according to claim 4, further comprising displaying means for displaying an operation guidance to an operator.

8. An image defect correcting circuit according to claim 7, wherein the displaying means displays information by which the operator is urged to pick up a white pattern.

9. An image defect correcting circuit according to claim 4, further comprising:
   a) a filter supplied with the output signal of the switching means and which eliminates a DC component and a low frequency component involved in the output signal of the switching means to output a filtered output signal; and
   b) selective outputting means supplied with the filtered output signal for selectively outputting the filtered output signal and a signal which results from phase-inverting the filtered output signal, an output of the selective outputting means being supplied to the comparing means.

10. An image defect correcting circuit according to claim 9, wherein the selective outputting means selectively outputs the filtered output signal and the phase inverted, filtered output signal on the basis of data which indicates whether the present operation mode is a white blemish detection mode or a black blemish detection mode.

11. An image defect correcting circuit according to claim 4, further comprising:
   a) display means for displaying the output signal of the switching means;
   b) input means for displaying a marker on the display means and outputting a defect position designating signal; and
   c) second position data generating means for generating position data corresponding to a position at which the marker is displayed when the defect position designating signal is input by the input means, position data generated from the second position data generating means being stored in the memory means.

12. An image defect correcting circuit for a solid state imager, comprising:

a) phase-inverting means for inverting the phases of output signals of respective pixels of a solid state image pickup element illuminated on its whole surface with a light of uniform brightness in association with a read cycle of the solid state image pickup element;

b) comparing means for comparing output signals of the phase inverting means with a predetermined level;

c) position data generating means for generating position data indicative of a position of a pixel which outputs a signal of a peculiar level on the basis of compared result of the comparing means;

d) interpolating means for interpolating an output signal output from the pixel located at the position indicated by the position data by using an output signal of other pixel and generating an interpolated output signal; and e) switching means for selectively switching between output signals of the respective pixels and the interpolated output signal of the interpolating means on the basis of the position data.

13. An image defect correcting circuit for a solid state imager in which video information corrected for a defective pixel among a plurality of pixels in a solid state image pickup element is generated by an interpolation processing on the basis of a video information of a certain pixel located at another position, comprising:

a) comparing means for comparing levels of video signals output from a plurality of pixels located near the defective pixel;

b) selecting means for selecting a video information of a pixel to be used in the interpolation processing on the basis of a compared result of the comparing means; and c) interpolating means for generating a video information corresponding to the position of the defective pixel on the basis of the video information of the pixel selected by the selecting means by the interpolation processing.

14. An image defect correcting circuit for a solid state imager according to claim 13, wherein the comparing means is composed of a register for storing output signals of a plurality of pixels located in the vicinity of the defective pixel of the solid state image pickup element, absolute value computing means for computing an absolute value of a level difference of output signals of respective pixels stored in the resister, and absolute value comparing means for comparing respective computed results of the absolute value computing means and wherein the selecting means is composed of a decoder for outputting a selection control signal on the basis of the computed results of the absolute value computing means, the selection control signal of the decoder being supplied to the interpolating means.

15. An image defect correcting circuit for a solid state imager, comprising:

a) position data generating means for generating position data indicative of a position of a pixel of respective pixels of a solid state image pickup element and which outputs a signal of peculiar level under the condition that no light is incident on said solid state image pickup element;

b) blemish level data generating means for generating blemish level data indicative of a level of a signal output from the pixel indicated by position data from said position data generating means;

c) memory means for storing said position data and said blemish level data; and d) correcting means for subtracting a signal of level indicated by said blemish level data from an output signal of the pixel located at the position indicated by said position data on the basis of an output signal from said memory means in the camera mode.

16. An image defect correcting circuit for a solid state imager, comprising:

a) position data generating means for generating position data indicative of a position of a pixel of respective pixels of a solid state image pickup element and which outputs a signal of a peculiar level under the condition that no light is incident on the solid state image pickup element;

b) blemish level data generating means for generating blemish level data indicative of a level of a signal output from the pixel indicated by position data from the position data generating means;

c) memory means for storing the position data and the blemish level data;

d) temperature measuring means for measuring a temperature of the solid state image pickup element;

e) temperature correcting means for temperature-correcting the blemish level data output from the memory means on the basis of an output signal of the temperature measuring means in the camera mode; and f) correcting means for subtracting a signal of a level indicated by the temperature-corrected blemish level data from the output signal of the pixel located at the position indicated by the position data on the basis of an output signal of the temperature correcting means and an output signal of the memory means.

17. An image defect correcting circuit for a solid state imager according to claim 15, further comprising:

a) an iris for controlling an amount of light incident on the solid state image pickup element; and b) iris control means for controlling the iris, the iris control means closing the iris when the position data generating means generates the position data.

18. An image defect correcting circuit for a solid state image imager according to claim 15, further comprising driving means for driving the solid state image pickup element, wherein the driving means ext ends a duration of a charge accumulation time of the solid state image pickup element longer than that of a charge accumulation time of the camera mode when the blemish level data generating means generates the blemish level data.

19. An image defect correcting circuit for a solid state imager according to claim 15, further comprising normalizing means for normalizing the blemish level data generated by the blemish level data generating means in response to the charge accumulation time of the solid state image pickup element and the temperature of the solid state image pickup element.

* * * * *